US010716010B2

(12) United States Patent
Cirkic et al.

(10) Patent No.: US 10,716,010 B2
(45) Date of Patent: Jul. 14, 2020

(54) TARGET CARRIER RADIO PREDICTIONS USING SOURCE CARRIER MEASUREMENTS

(71) Applicant: Telefonaktiebolaget LM Ericsson (publ), Stockholm (SE)

(72) Inventors: Mirsad Cirkic, Linköping (SE); Samuel Axelsson, Linköping (SE); Joel Berglund, Linköping (SE); Fredrik Gunnarsson, Linköping (SE); Pradeepa Ramachandra, Linköping (SE); Henrik Rydén, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/086,196

(22) PCT Filed: Mar. 21, 2016

(86) PCT No.: PCT/EP2016/056122
§ 371 (c)(1),
(2) Date: Sep. 18, 2018

(87) PCT Pub. No.: WO2017/162262
PCT Pub. Date: Sep. 28, 2017

(65) Prior Publication Data
US 2019/0357057 A1 Nov. 21, 2019

(51) Int. Cl.
*H04W 16/22* (2009.01)
*H04B 17/373* (2015.01)
(Continued)

(52) U.S. Cl.
CPC .......... *H04W 16/22* (2013.01); *H04B 17/373* (2015.01); *H04B 17/382* (2015.01);
(Continued)

(58) Field of Classification Search
CPC ..... H04W 16/22; H04W 24/08; H04W 24/10; H04B 17/373; H04B 17/3913; H04B 17/382
See application file for complete search history.

(56) References Cited

U.S. PATENT DOCUMENTS 9,900,790 B1 * 2/2018 Sheen ................... H04L 41/147
2010/0130206 A1 * 5/2010 Chin ..................... H04W 36/30
455/436

(Continued)

FOREIGN PATENT DOCUMENTS

EP         2387271 A1   11/2011
WO   WO 2008119934 A2   10/2008

OTHER PUBLICATIONS

International Search Report and Written Opinion of the International Searching Authority, PCT/EP2016/056122, dated Nov. 30, 2016, 11 pages.

*Primary Examiner* — Lewis G West
(74) *Attorney, Agent, or Firm* — Sage Patent Group

(57) ABSTRACT

The present invention relates to an improved predicting of target carrier radio conditions in a communication network. The improved prediction is achieved by acquiring, by a first network node, measurement data based on radio signals at a source carrier and a first target carrier. Subsequently, a target carrier radio condition prediction function is identified by the first network node or a second network node.

17 Claims, 22 Drawing Sheets

(51) Int. Cl.
*H04B 17/382* (2015.01)
*H04B 17/391* (2015.01)
*H04W 24/08* (2009.01)
*H04W 24/10* (2009.01)

(52) U.S. Cl.
CPC ........ *H04B 17/3913* (2015.01); *H04W 24/08* (2013.01); *H04W 24/10* (2013.01)

(56) References Cited

U.S. PATENT DOCUMENTS

| | | | | |
|---|---|---|---|---|
| 2011/0059741 A1* | 3/2011 | Klein | .................... | H04W 36/30 455/436 |
| 2013/0053025 A1* | 2/2013 | Lindoff | ............. | H04W 36/0088 455/424 |

* cited by examiner

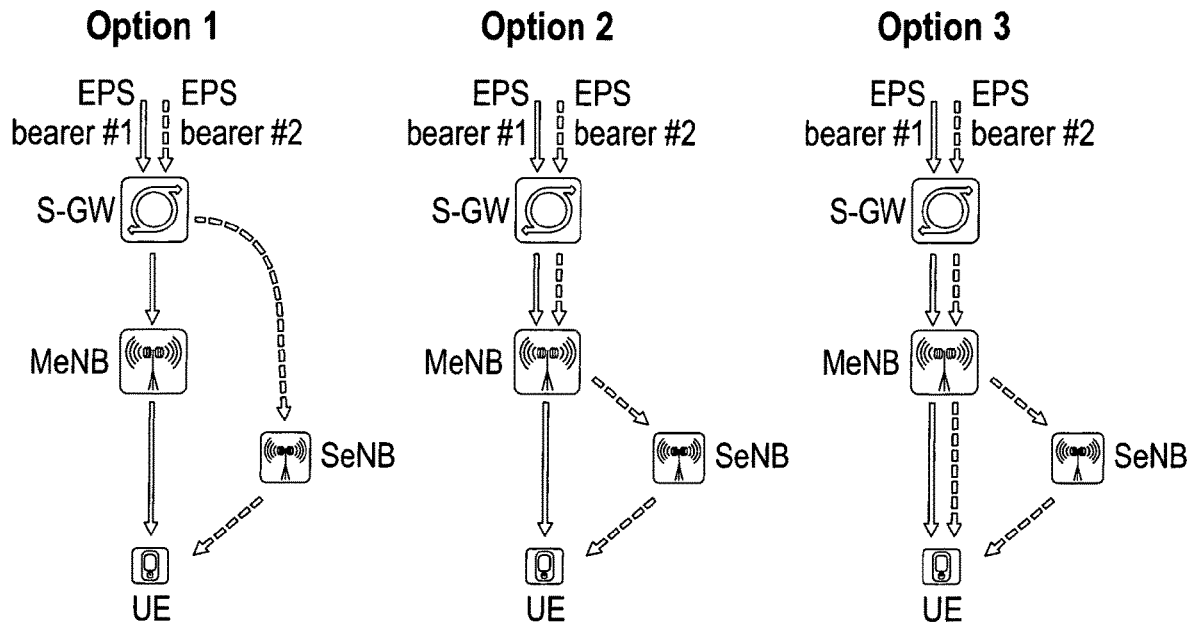
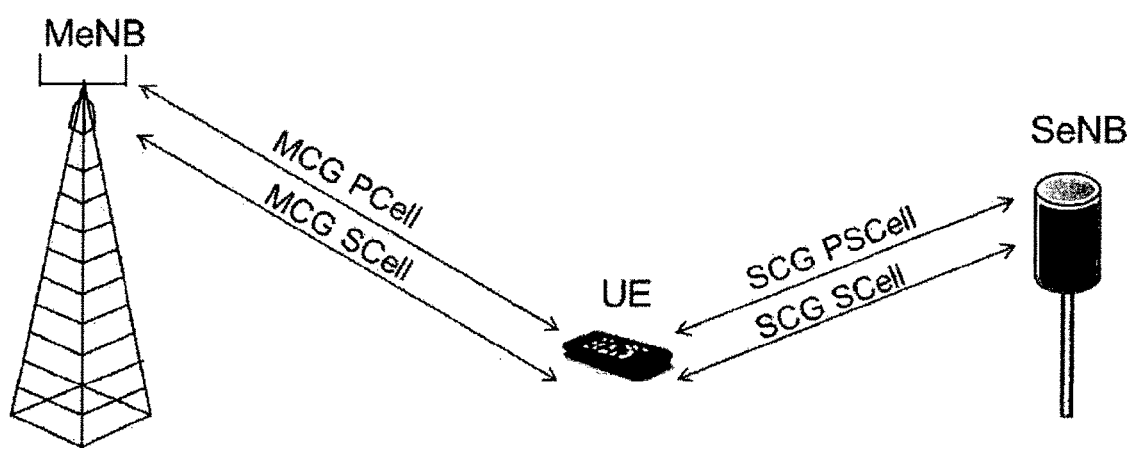
FIG. 5

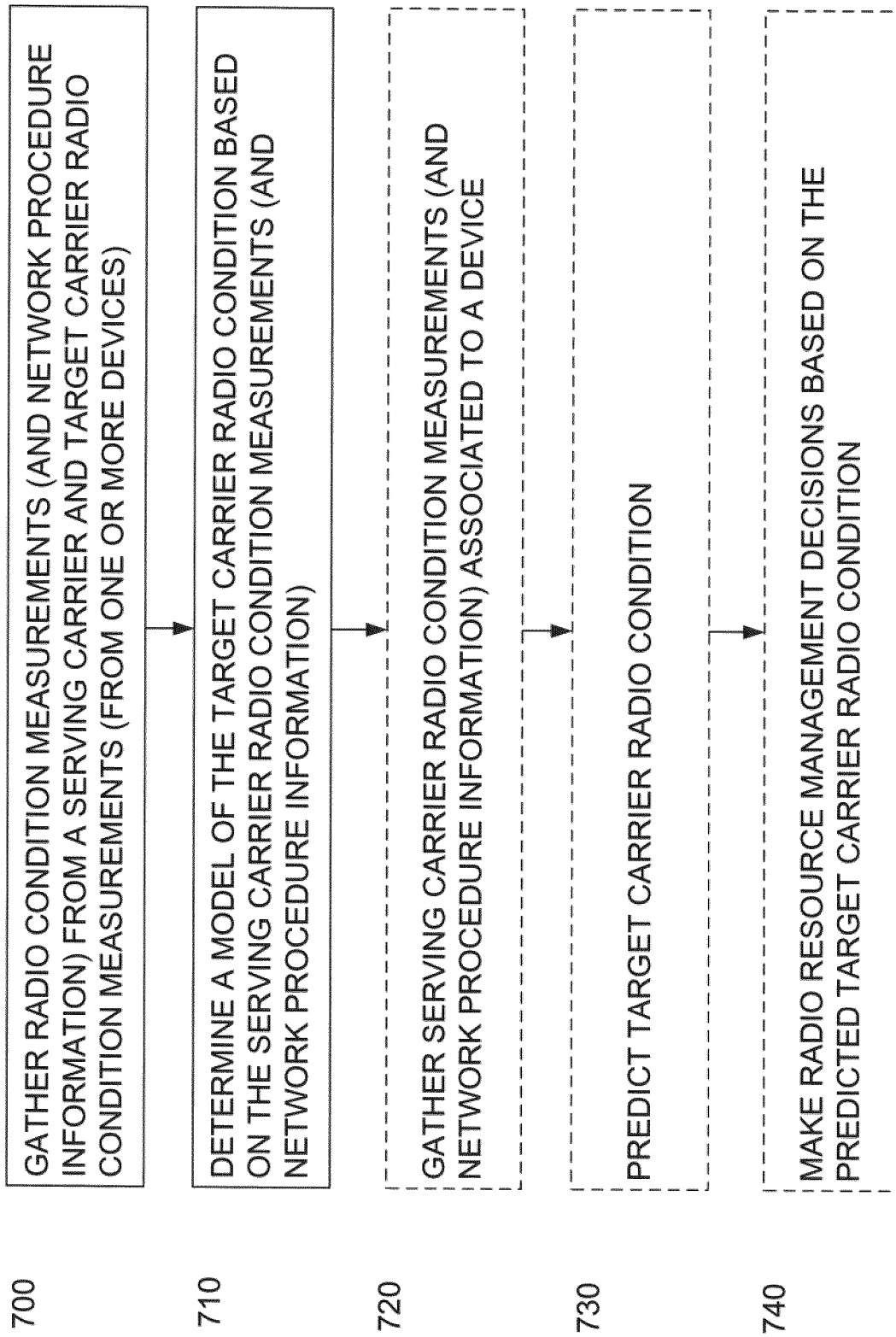

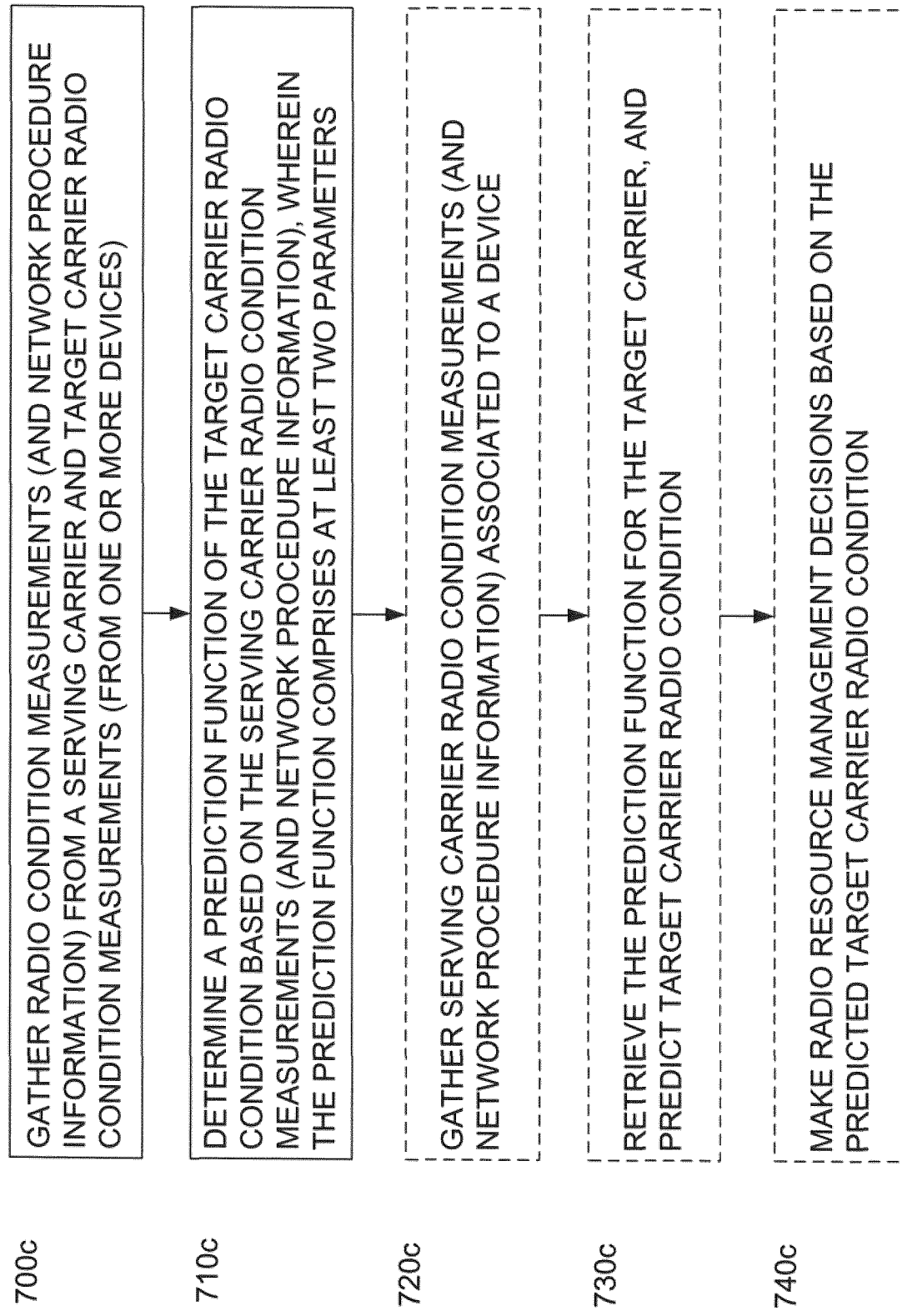

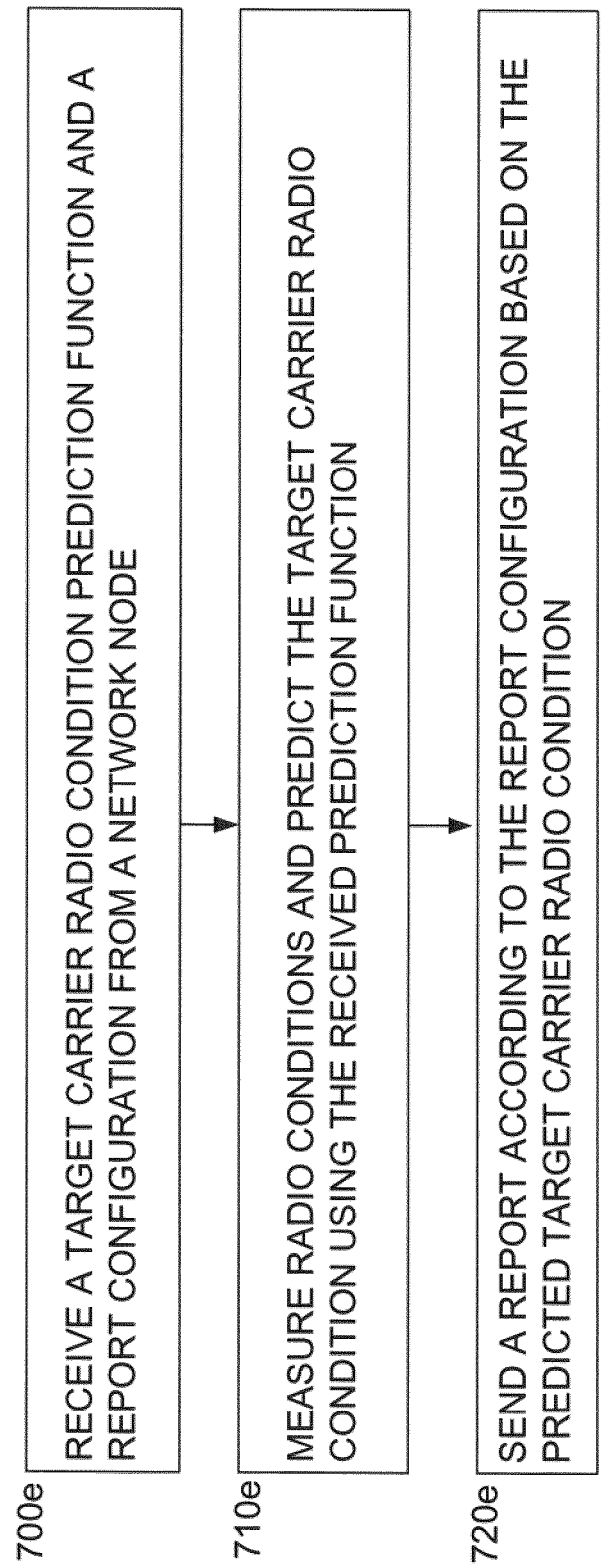

TARGET CARRIER RADIO PREDICTIONS USING SOURCE CARRIER MEASUREMENTS

CROSS REFERENCE TO RELATED APPLICATIONS

This application is a 35 U.S.C. § 371 national stage application of PCT International Application No. PCT/EP2016/056122 filed on Mar. 21, 2016, the disclosure and content of which is incorporated by reference herein in its entirety.

TECHNICAL FIELD

The present invention relates to a method, a network node, a mobile terminal, a computer-readable storage medium, a computer program, and a carrier containing the computer program for predicting a target carrier radio condition. More particular, the present invention relates to identifying a target carrier radio condition prediction function by using acquired measurement data based on radio signals at a source carrier and a first target carrier.

BACKGROUND

As the number of subscribers increase together with the performance requirements in communication networks, so does the requirement on coordination in the communication network. If, for example, certain parts of the communication network (e.g., certain cells or cell sectors) are crowded with lots of mobile terminals (UEs) while other parts (e.g., other cells) are not, the network capacity will be left unutilized since the crowded cells, which have only a portion of the total network capacity, will limit its users and UEs, respectively, while at the same time other cells or cell sectors, that are (close to) empty, are under-utilized.

An example of such a communication network is the architecture of the LTE system as shown in FIG. 1, including radio access nodes (eNBs), also referred to as a network node in the following, and evolved packet core nodes (MME/S-GW) as well as logical interfaces between eNBs (X2) and between eNBs and MME/S-GWs (S1). The present description uses the LTE system as an example, but generalizes to other wireless networking systems and standards as well. In more general terms, such a network node may provide a radio access to a mobile terminal (UE) and also has some kind of coverage area in which it may provide the radio access. Such a radio access may be of any spectrum or standard (GSM, GPRS, 3G, 4G, LTE, WiFi, even DECT, etc.). The mobile terminal (UE) may thus be connected to one or more radio access nodes in the communication network, and may be supported by one or more core network nodes. Furthermore, the UE may be served via one or more frequency carriers, and one or more radio access technologies.

One feature aimed to solve the problem of coordination in the communication network is load balancing where different cells, that overlap (in communication terms, but could also overlap in geographical terms), share the current load on the network. This feature moves UEs from the high-loaded cells to the less loaded cells. More specifically, in order to increase a capacity in the communication network the operator may deploy cells on multiple frequency layers, also referred to as carriers, as illustrated in FIG. 2. Load balancing is a technique to balance the traffic load between overlaid cells in the communication network in order to utilize the capacity on the different frequency layers. In FIG. 2, potential load balancing opportunities are indicated by respective arrows and include load balancing opportunities between co-located cells as served by the same eNB and between non-co-located cells as served by different eNBs. In general, each eNB assesses the traffic load in its cells. The traffic load information is exchanged between the cells and/or eNBs, after which a load balancing algorithm identifies whether there is a need to move UEs between the cells in order to balance the traffic load. If there is a need to move UEs in order to balance the traffic load, UEs are selected and ordered to perform inter-frequency measurements in order to be moved in some way (for example, handover, release with redirect, etc.).

Another feature for solving this coordination problem is carrier aggregation (CA) where different carriers are aggregated for one UE. This enables a UE to transmit/receive data over more than one frequency layer/carriers, and thus provides a higher capacity to the UEs. When multiple carriers are available, it is possible to deploy several cells with similar coverage area as illustrated in FIG. 3 which shows the case of co-located cells being served by the same radio base station (eNB), or with different coverage area, each at a different carrier than the other (as illustrated by FIG. 2). Each carrier is referred to as a Component Carrier (CC).

In CA, two or more such CCs are aggregated in order to support wider transmission bandwidths. A UE may simultaneously receive or transmit on one or multiple CCs depending on its capabilities. A UE with reception and/or transmission capabilities for CA can simultaneously receive and/or transmit on multiple CCs corresponding to multiple serving cells. Here, CA is specified for both contiguous and non-contiguous CCs.

It is possible to configure a UE to aggregate a different number of CCs originating from the same eNB and of possibly different bandwidths in the UL and the DL. The number of DL CCs that can be configured depends on the DL aggregation capability of the UE and the network. The number of UL CCs that can be configured depends on the UL aggregation capability of the UE and the network. CCs originating from the same eNB need not to provide the same coverage. An example is shown in FIG. 4 illustrating a radio base station (eNB) with several co-located cells configured as different CC for a UE, where one CC is the Primary cell (PCell), and two further CCs are Secondary cells (SCells).

A UE may indicate to the serving radio base station (eNB) its capability to support one or more SCells in the DL, as well as one or more SCells in the UL via RRC signaling (see Chapter 18 in 3GPP TS 36.300, V13.2.0). Further, CA capable mobile terminals/devices (UEs) may be configured with one or more SCells in UL and/or DL via RRC signaling, using the message RRCConnectionReconfiguration and the information element sCellToAddModList-r10 in 3GPP TS36.331 V13.0.0.

Moreover, CA configured mobile devices (UEs) may have one or more of its SCells activated via signaling from the serving radio base station, using an activation MAC control element. CA activated mobile devices may have data scheduled at one or more of its SCells via control signaling from the radio base station. This control signaling may be sent via the physical control channel and MAC control element, and may refer to a DL SCell resource and/or an UL SCell resource. Moreover, if cross-carrier scheduling is supported, the SCell resource assignment is signaled to the mobile device (UE) via the PCell physical control channel and/or MAC control elements. When the UE is scheduled over two or more CCs, the data will be mapped to PRBs both on the PCell as well as the SCell(s).

A typical way of finding the right UEs for inter-frequency handover or carrier aggregation is to let the network request a number of UEs to measure the radio conditions (such as RSRP) in the target carrier, and to find the potential target cells for the chosen UEs. After the UEs have conducted their measurements, the reports are fed back to the serving cell which then takes a decision which of the UEs to move to which cell.

Further, the concept of Dual Connectivity (DC) as introduced in 3GPP in Rel. 12 enables the establishment of user plane connections via another radio node, referred to as a Secondary eNB (SeNB), while maintaining the higher layer connection management (RRC) via a Master eNB (MeNB). This means that a device (UE) may have user plane connections completely via the MeNB, completely via the SeNB, or are split between both MeNB and SeNB, as illustrated in FIG. 5a.

Furthermore, it is also possible to aggregate several component carriers at the MeNB (the CCs are referred to as a MeNB Cell Group (MCG)) as well as at SeNB (the CCs are referred to as a SeNB Cell Group (SCG)). Each cell group comprises one or more CC. At the MeNB, these are denoted MCG PCell and MCG SCell, while at the SeNB, these are denoted SCG PSCell and SCell. Note that the PSCell via SeNB has some of the scope of a MCG PCell, but not all. For example RRC signaling is only handled via the PCell. The cell groups are illustrated by FIG. 5b.

The cell group notation may be also used when labelling data radio bearers (DRB)—a DRB via MeNB is referred to as a MCG DRB, a DRB via SeNB is referred to as a SCG DRB and a DRB split between both MeNB and SeNB is referred to as a Split DRB. When generalizing the concept of dual connectivity, it may also be possible to consider connections to more than one SeNB, but also where the SeNB supports a different radio access technology, such as WiFi, 5G, 3G, 2G, etc.

Furthermore, an unlicensed carrier operation may be different from licensed carrier operation in that there are some co-existence criteria that have to be met in order to co-exist with other connections in the same band. This is discussed in 3GPP (TR 36.889 V 13.0.0) as Licensed Assisted Access (LAA), which essentially is a PCell operating on a licensed carrier and an SCell operating on an unlicensed carrier, where the SCell then also has to meet the co-existence criteria. FIG. 6 illustrates some different deployment scenarios in that context.

Problems with Existing Solutions

It is the purpose of the load balancing feature to neutralize imbalances (over-utilization vs. under-utilization) when possible. One major difficulty in load balancing is to choose/select which UEs to move from one cell (the source cell) that is highly loaded to another cell (the target cell) that is under-utilized. Each unqualified load balancing inter-frequency measurement is a waste of resources such as signaling, processing, UE battery consumption and user performance. The disadvantage is two-fold: many users will spend measurement resources unnecessarily and the cell will continue to stay in a high-load situation for a longer period of time.

Aggregation features such as CA, DC and LAA also share the need to understand (e.g., monitor, take into account) radio conditions on other carriers for an individual UE. The challenge in these features is to find and assign the appropriate secondary (target) carrier/cell, i.e. to improve the decision making. Choosing an unsuitable cell/carrier will, by contrast, not provide any aggregation gains while still having the cost of initiating aggregation in terms of signaling, processing, memory, UE battery consumption, etc.

Performing inter-frequency measurements requires in most cases the UEs to reconfigure their receive chains, for receiving and processing a radio signal in respect to one or more antennas, to a different frequency carrier from that in the source cell, unless the UE is supporting multiple receive chains that can measure simultaneously on several frequency carriers. In the former case, the UE will not be able to receive from the source cell in the meantime. In both cases more UE battery capacity is consumed.

Some predictive methods are known in the prior art. GB 2 372 404 A and WO 00/38457 A1, teach a method for handover based on a prediction/estimation of a measurement, e.g. a predicted target carrier radio signal strength, wherein the prediction is based on a serving carrier cell radio signal strength measurement and a fixed offset. Such methods are applicable only under limited assumptions and conditions. The typical scenario is when the cells or cell sectors at the source (frequency) and target carrier (frequency) are co-located and are thereby served by the same base station (eNB) or antenna system. In such a scenario it had been assumed that, e.g., a path loss difference remains constant for all locations of the UE, or, in other words, for which it may be assumed that a quality difference between the frequency bands is constant. As such, it has been assumed that a single (static, predetermined) functional dependence (being a difference, such as a fixed offset) between the co-located cells always remains the same and is expected to represent this typical scenario well. For example, it has been assumed that a received signal code power (RSCP) difference between the co-located cells remains constant.

In situations, however, when cells at the different carriers are not co-located or when radio propagation are spatially and/or timely fluctuate, then this convention static model is not expected to represent the scenario well and therefore the proposed conventional methods perform badly. Furthermore, the proposed conventional method is based on a simple model with very limited capability of representing the potentially complex relation between the radio signal strength of the cells at two different carriers.

As such, there is a need for improving the prediction of target carrier radio conditions in radio signal situations that change spatially and/or over time.

Solution

Accordingly, it is an object of the present invention to solve the above described problems. In particular, it is an object of the present invention to overcome the above-described limitations that result from using a single and static functional relation between the radio conditions at a source carrier and a target carrier.

A suitable method, network node, mobile terminal, computer-readable storage medium, computer program, and carrier containing the computer program for an improved prediction of the target carrier radio condition are defined in the independent claims. Advantageous embodiments are defined by the dependent claims.

Here, in order to achieve improved predictions of target carrier radio conditions in radio signal situations that change spatially and/or over time, the present concepts proposes to acquire relevant measurement data being related to source and target carriers and to identify and train a prediction function, out of a pool of plural available prediction functions, to achieve an improved matching between the source and target carriers.

In one embodiment, a method is defined for predicting a target carrier radio condition in a communication network which comprises the steps of acquiring, by a first network node, measurement data based on radio signals at a source carrier and a first target carrier; and identifying, by the first network node or a second network node, a target carrier radio condition prediction function using the acquired measurement data.

In another embodiment, a network node and a mobile terminal are respectively defined which are adapted to perform the above method. In still further embodiments, a corresponding computer-readable storage medium, computer program, and carrier containing the computer program are defined.

BRIEF DESCRIPTION OF THE DRAWINGS

The embodiments herein will now be further described in more detail in the following detailed description by reference to the appended drawings illustrating the embodiments and in which:

FIG. 5 is a schematic diagram for illustrating the concept of dual connectivity with a) three different user plan configuration options, and b) optional carrier aggregation per radio node.

FIG. 10A-FIG. 10F are schematic flow diagrams illustrating another embodiments of a method for predicting a target carrier radio condition in a communication network.

DESCRIPTION OF THE EMBODIMENTS

In the following, embodiments are described with reference to the appended Figures. It is noted that the following description contains examples only and should not be construed as limiting the invention. A person skilled in the art will recognize additional features and advantages upon reading the following detailed description. Further, similar or same reference signs indicate similar or same elements or operations.

The following proposes a mechanism for training/identifying a particular model/function to predict other carriers/RATs radio conditions based on measurements that are readily available or acquirable. This identified prediction function may then be used in different RRM decisions, such as IFLB, secondary cell selection and bad coverage mobility decisions. The purpose is to enable faster and more accurate RRM decision making while reducing the number of measurements (radio resources, signaling overhead, energy spent) needed to make a correct RRM decision.

Figure 1:
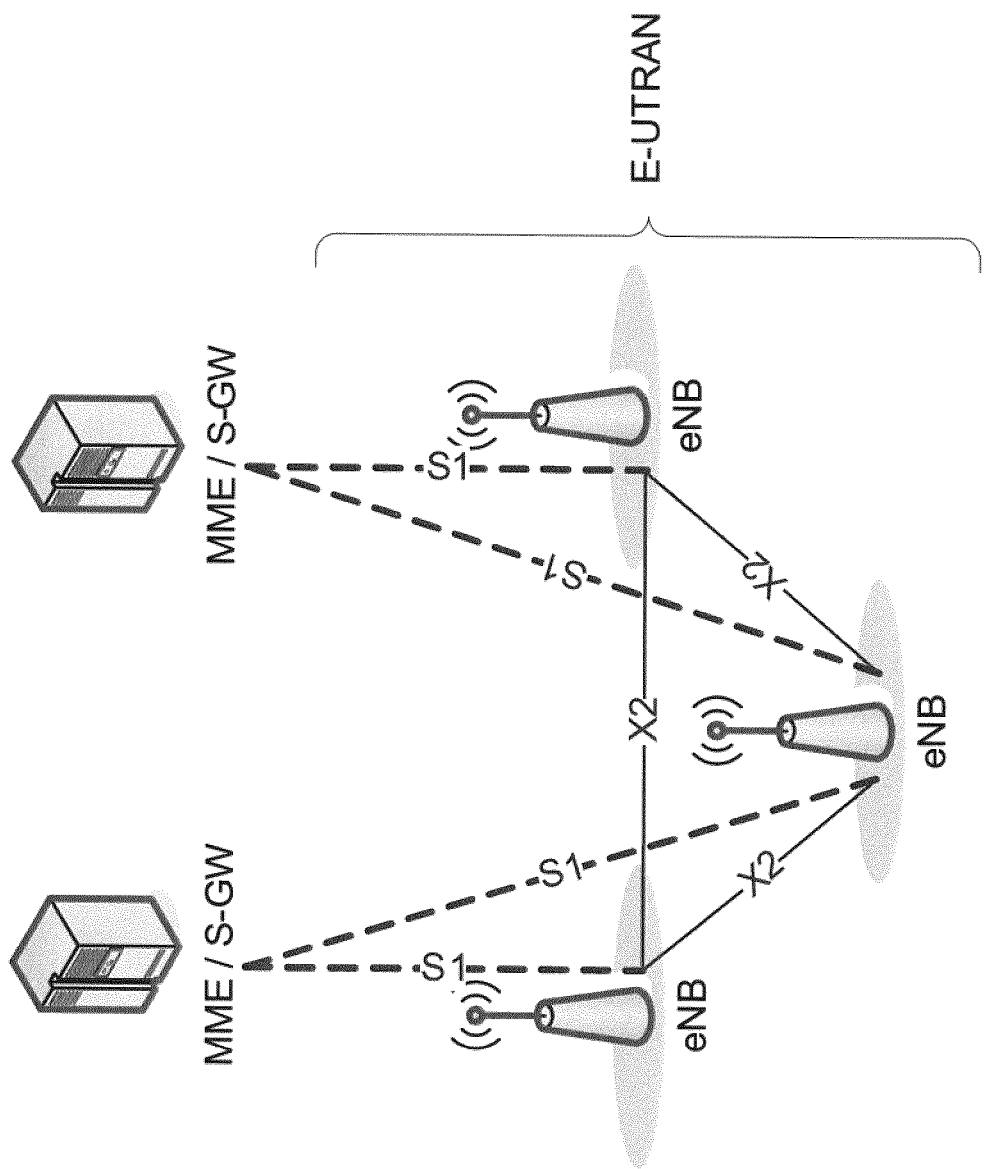
FIG. 1 is a schematic diagram of the LTE architecture showing logical interfaces between eNBs (X2) and between eNB and MME/S-GW (S1).
Figure 2:
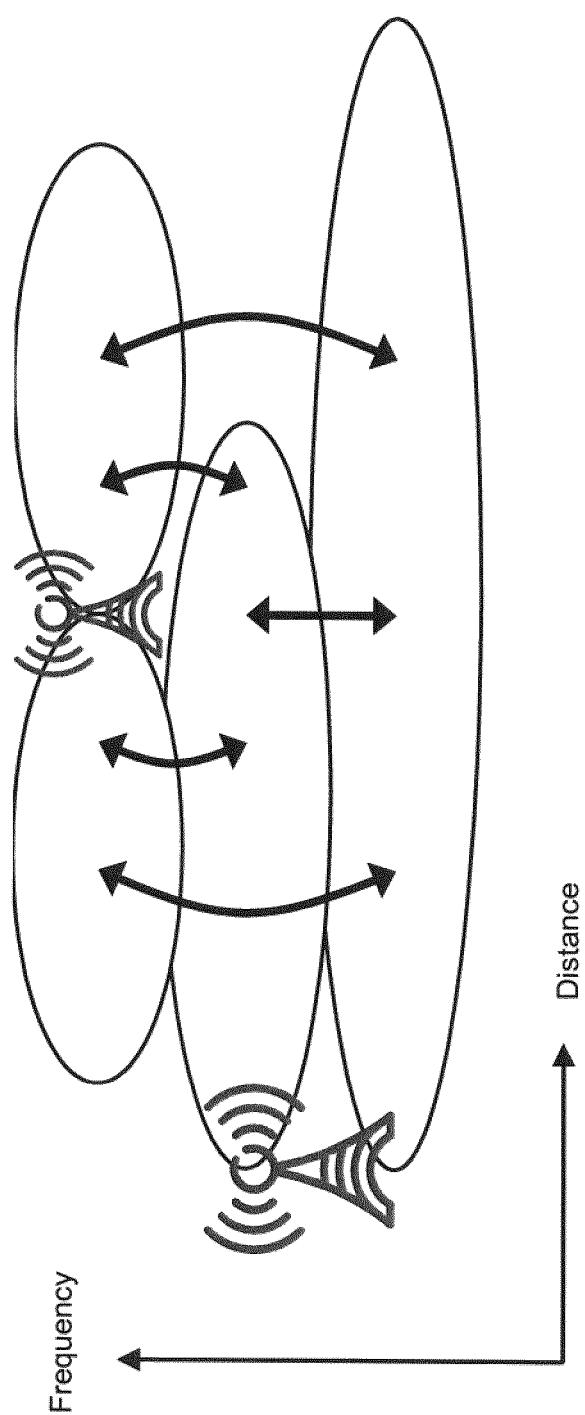
FIG. 2 is a schematic diagram of a communication network with multiple frequency layers and potential load balancing opportunities (indicated by arrows).
Figure 3:
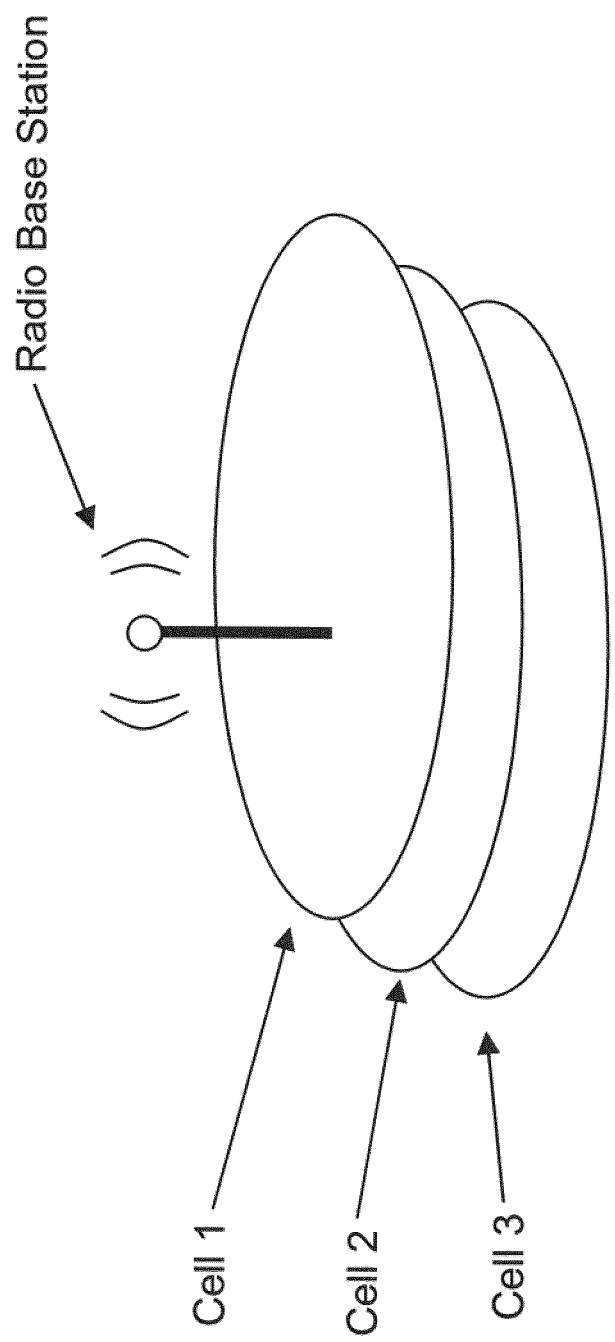
FIG. 3 is a schematic diagram of a radio base station with several co-located cells occupying roughly the same area.
Figure 4:
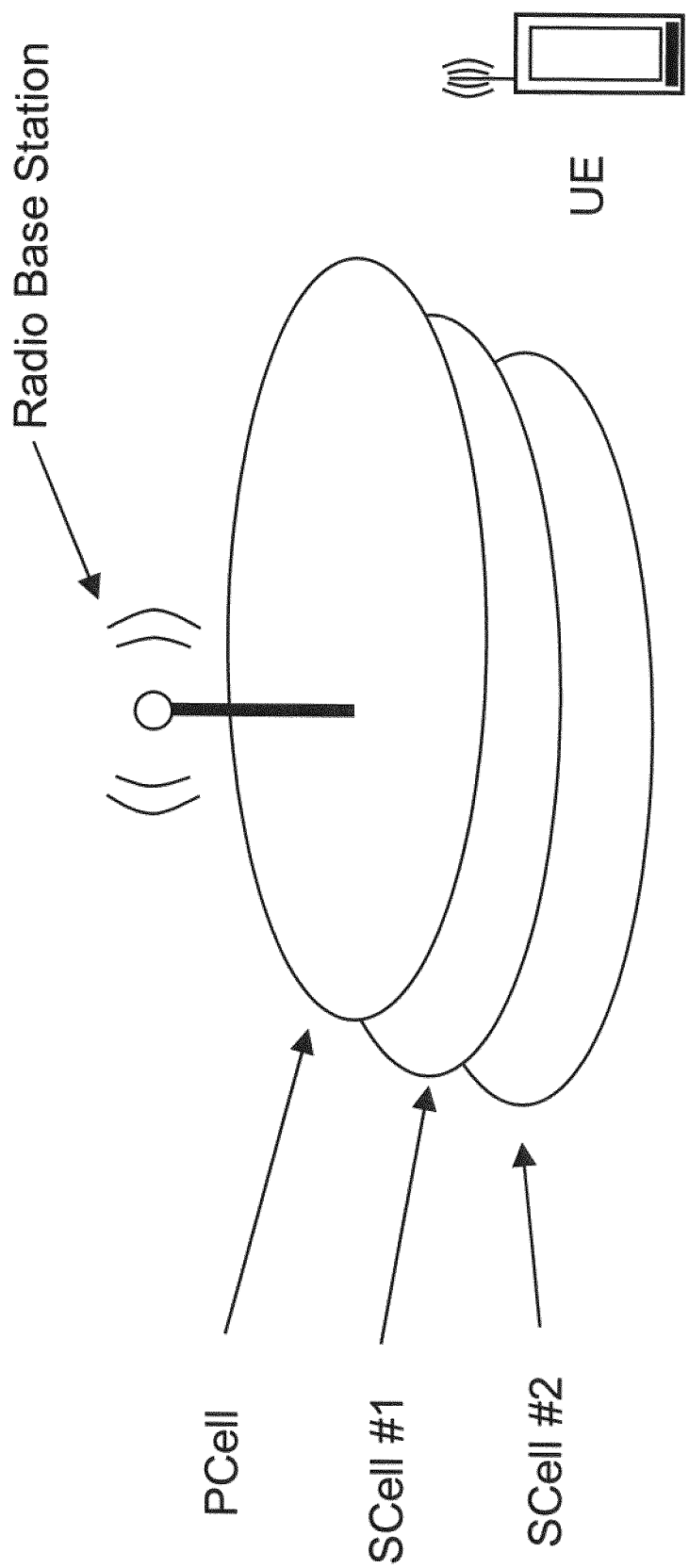
FIG. 4 is a schematic diagram of a radio base station with several cells configured as different component carriers (CC) for a UE, where one CC is the Primary Cell (PCell) and two additional Secondary Cells (SCells) are included.
Figure 6:
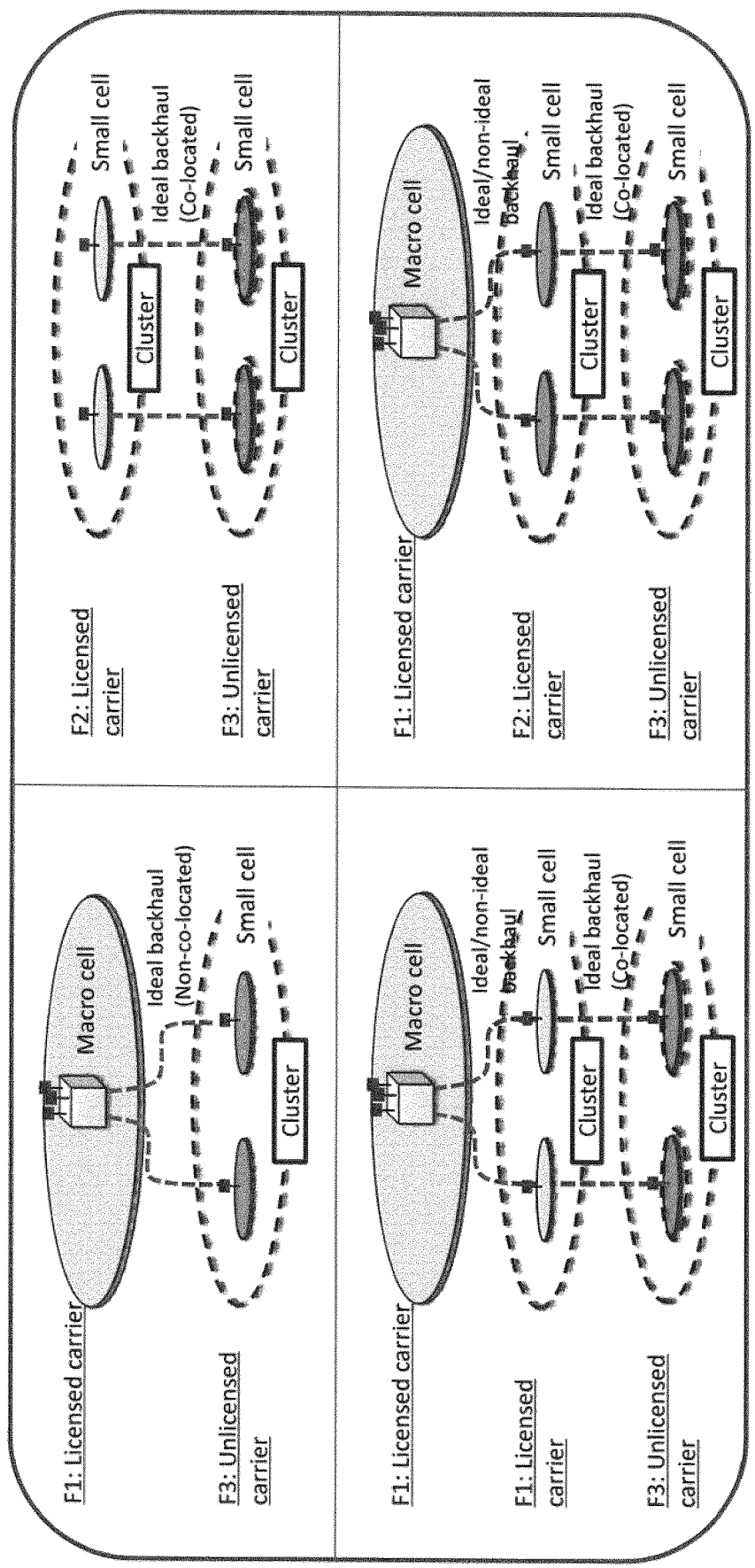
FIG. 6 is a schematic diagram for illustrating unlicensed LTE operation with some different deployment options.
Figure 7:
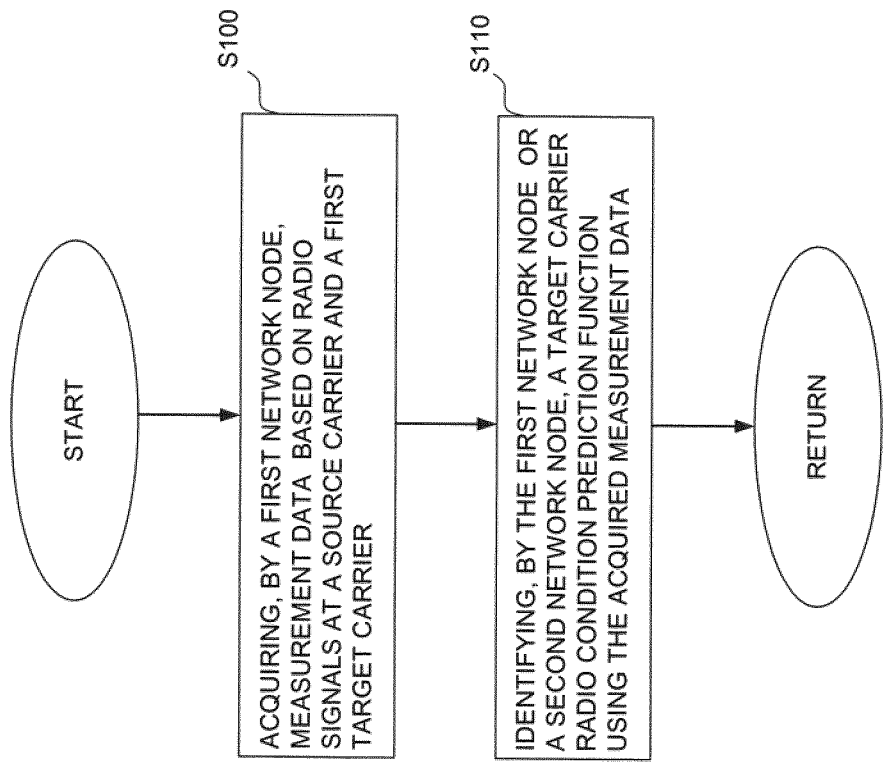
FIG. 7 is a schematic flow diagram illustrating an embodiment of a method for predicting a target carrier radio condition in a communication network.

FIG. 7 describes an embodiment method for predicting a target carrier radio condition in a communication network according to an embodiment. Here, the communication network may comprise a plurality of network nodes. The network nodes may provide radio access to one or a plurality of UEs within one or more cells that are either co-located cells or non-co-located cells. The prediction of a target carrier radio condition refers to a prediction of a target carrier radio condition of a co-located or a non-co-located cell to which a specific UE may be assigned if the target carrier radio conditions are suitable in the context of the general load balancing problem. A central aspect of an improved prediction process according to this method, as compared to the conventional technique described above, refers to the identification of a proper prediction function so that dynamic changes and/or particular radio conditions within the communication network are taken into account.

As further shown in FIG. 7, the method includes a step S100 of acquiring, by a first network node 10, measurement data which are based on radio signals from one or more (co-located or non-co-located) cells at a source carrier and one or more (co-located or non-co-located) cells at a first target carrier. The method according to FIG. 7 further includes a step S110 of identifying, by the first network node 10 or the second network node 20, a target carrier condition prediction function (f) by using the acquired measurement data.

More specifically, the measurement data may be acquired in step S100 directly at a network node, for example based on UL transmissions from the UEs, and/or the measurement data may be requested to be gathered at one or more UEs, for example based on DL transmissions and are subsequently reported (e.g., as feedback reports) and thus acquired by the network node 10. The measurement data may refer to radio condition measurements (in the UL and/or DL)) of one or more cells at the source carrier and of one or more cells at the target carrier. In particular, the measurement data may refer to measurement data that are readily available, e.g. as used for other purposes other than identifying the prediction function, such as PMI, TA, or may refer to measurement data such as RSRP where the network node 10 requests new measurement data to be acquired and reported from one or more UEs that belong to a certain cell, for example in which there is a small load condition, and in which the prediction function requires an update or the like. In a preferred embodiment, the measurement data may comprises at least one of a radio signal strength (from one or more cells) at the source carrier, a precoder matrix indicator, PMI, of the source carrier, an antenna beam indicator, an angle of arrival, UL radio condition measurements (at a network node), and UL angle data of arrival measurements. Further, as indicated above, the radio signals which are used as a basis for acquiring the measurement data may be UL radio signals towards and/or DL radio signals from either the same (as the network node 10 acquiring the measurement data) or different radio network nodes.

Optionally, in step S100 according to FIG. 7, also network procedure information may be acquired. Such network procedure information may, for example, be related to the specific UE type, i.e., to the specific UE capabilities in terms of supported carriers, supported transmission mode etc., as this will impact what measurements may be acquired from the UE. Based on this network procedure information about the specific UE, the network node may use different procedures to collect the required measurement data, or prepare an adapted request to the UE to acquire the measurement data. Furthermore, the network procedure information may also relate to load information of the different cells in the communication network. By using such load information and the prediction function, the network node may be able to find a good candidate cell to off-load UEs if it has both good radio conditions in the target carrier and is not highly loaded, i.e. has a load level that is below a specific threshold.

The identification step S110 according to FIG. 7 identifies a particular target carrier condition prediction function, f, for example from a pool of prediction functions, which provides an appropriate mapping between the acquired source carrier and target carrier measurement data. In other words, during this training phase, the network generates a model (prediction function f) that maps the serving carrier information input x to the target carrier output y, f(x)→y. Here, the identification of a particular target carrier condition prediction function f may be related to a particular (mathematical) type of prediction function, and my further include a training/estimation of one or more parameters of the prediction function in order to achieve an improved matching between the acquired source carrier and target carrier measurement data. Further details of this identification step will be elaborated below. Furthermore, the identification step S110 may include a case in which the acquired measurement data are transmitted to a second network node 20 which may either be a network node that also provides radio access to UEs or a core network node (such as MMS/E-GW), and where it is the second network node 20 that performs the identification step S110 and subsequently transmits the identified prediction function to the first network node 10.

Here, the target carrier radio condition prediction function is a function f(x)→y that maps the information x (measurement data) from the source carrier to the radio condition of the first target carrier y. A particular type of the prediction function f that is best suited for the current radio conditions may be identified based on measurement data (and optionally measurement reports) conducted in the source carrier and the target carrier. The source carrier radio condition measurements may comprise one or more of the following:

Radio signal strength from one or more cells at the source carrier;
Precoder Matrix Indicator (PMI) of the serving carrier, antenna beam indicator, angle of arrival;
Timing advance (TA) of the serving carrier;
UL radio condition measurements at a radio network node;
UL angle of arrival measurements at a radio network node;

The measurement data, based on which the prediction function f is identified, may be obtained via feedback reports from the UE to the radio network node and are based on DL radio signals from either the same and/or a different radio network node. In a further embodiment, the acquired measurement data do not have to stem from one carrier only, instead the acquired measurement data used for identifying the prediction function may stem from a first and a second carrier that in turn can be used to predict the radio condition on a third carrier.

The following describes examples of different prediction function types, from which a particular prediction function may be identified/selected:

(A) Linear regression prediction function: The radio condition measurement data vector x (serving carrier information) may be used in a linear regression prediction function as follows:

$$f(x) = \sum_i w_i x_i,$$

where $w_i$ is the weight for feature i. The model-specific parameter according to this embodiment is the weight ($w_i$) for each feature in x. For example, feature 1 may be the RSRP from one cell, and feature 2 may be the RSRP from another cell on the source carrier.

(B) Maximum Likelihood prediction function: According to such an embodiment, the radio condition measurement data vector x (serving carrier information) may be used in a maximum likelihood prediction function approach according to the function below:

$$f(x) = \prod_i w_i g(x_i \mid \mu_i, \sigma_i),$$

where $g(x_i|\mu_i,\sigma_i)$ is the probability of the measured feature i in x when using a Gaussian distribution with mean $\mu_i$, standard deviation $\sigma_i$ and $w_i$ is a weight. The model-specific parameter information in this method is the Gaussian distribution parameters for each feature ($\mu_i$, $\sigma_i$, $w_i$).

(C) Relative vector distance based prediction function: According to such an embodiment, the radio condition prediction (mapping function 1) may also be based on a weighted proximity to reference measurement data. For example, if a cell at a different carrier is most favourable at a position where the UE observes (measures) the (reference) serving carrier measurement vector $\theta=[\theta_1, \ldots \theta_M]^T$, then the predicted radio condition may be a mapping from $\theta$ and x, that is $f(\theta,x)$.

One example of such a mapping is based on Euclidian distance $$f(x) = w_0 + \sum_i w_i |x_i - \theta_i|,$$

Another example is to also consider polynomial mappings such as $$f(x) = w_0 + \sum_c \sum_i w_{i,c} |x_i - \theta_i|^c$$

The above proposed embodiments and concepts therefore comprises a main phase (training phase) in which a target carrier radio condition prediction function f(x)→y is identified based on measurements (and optionally measurement reports) at the source and target carrier. Optionally, this training phase may be supported by a separate network node 20, where the first network node 10 forwards acquired measurements to the separate (second) network node 20 which performs the prediction modeling and returns the identified prediction model (prediction function f) to the first radio network node 10. Then, in a subsequent execution phase (to be described below) the target carrier's radio conditions are predicted based on measurements (and measurement reports) conducted in a source carrier and the identified prediction function f.

In a preferred embodiment, the pool of target carrier radio condition prediction functions f and therefore also the identified prediction function depends on measurement data of at least two different radio signal conditions, for example PMI and TA with regard to the same cell, or for example RSRP from one cell and RSRP from another cell. Furthermore, the target carrier radio condition prediction function f has at least two (model-specific) parameters (for example being related to the different radio signal conditions) which may be additionally trained/adapted in the training phase to identify a prediction function f that provides an improved mapping between the measurement data x and y. In another embodiment, the prediction function f may be also a function of time and/or a status of the environment (for example in terms of physical objects). In particular, as the environment can change, for example due to vehicles being parked, leaves in trees or rain/snow, the mapping f(x)→y may be changed accordingly, such that it becomes f(x, t)→y, where t stands for the status of the environment in terms of physical objects or time or a combination of the two.

When sufficiently many measurement data have been collected, the network node 10 or the network node 20 identifies the prediction function f (step 110). The determination as to whether a sufficient number of measurements (and measurement data) have been gathered/acquired may, for example, be made on the basis of the number of UEs that have performed inter-carrier measurements, or when the identified prediction function f is accurate enough, for example by calculating the sum squared prediction error $(\Sigma \|f(x)-y\|^2)$. Moreover, the identification (selection) of a particular prediction function out of a pool of available prediction functions (f1, ... , fn) may be based on a statistical analysis, for example, a comparison of respective sum squared prediction errors $(\Sigma \|f1(x)-y\|^2) \ldots , (\Sigma \|fn(x)-y\|^2)$. This may also include a training of prediction function parameters (for example, weights) of the respective available prediction functions (f1, ... , fn) in order to derive and identify a prediction function for which the statistical analysis achieves an optimal result.

In addition, the identification (selection) of a particular prediction function out of a pool of available prediction functions (f1, ... , fn) may also be based on the method complexity. Here, the method complexity depends partly on the available measurements at one network node or the amount of parameters the method requires. Typically more measurements and model parameters increases the method complexity.

The above training phase for identifying a matching prediction function is preferably conducted when the communication network has a load that is smaller as a predetermined load factor. In such a situation, the communication network is not over-loaded, and thus requesting to acquire measurement data (together with the reports from the UEs) does not have a significant impact on the overall network performance. Alternatively, the training phase for identifying a matching prediction function may be conducted when a number of source carrier measurements and a number of target carrier measurements are larger than a predetermined number, in other words, when a sufficient number of source and target carrier measurements have been acquired. This provides a sufficient statistical certainty and avoids making erroneous RRM decisions based on prediction function that do not provide an appropriate matching.

Based on the aforementioned input measurement data (e.g., RSRP, PMI, TA), combined or separately, a variety of different output data values may be predicted that are related to radio conditions, such as:

K-best target cell-ids, where K=1, 2 . . . ;
K-best target cell RSRP values;
K-best target cell Signal to Interference plus Noise Ratio (SINR) values FIGS. 8A and 8B describe a method for predicting a target carrier radio condition in a communication network according to another preferred embodiment. Here, in addition to the steps S100 and S110 as described above with regard to FIG. 7, step S115 may be performed in which the first network node 10 transmits the identified target carrier condition prediction function, f, to a specific mobile terminal 30 or a plurality of specific mobile terminals where it will be subsequently used. In particular, this transmission from the first network node 10 may be performed by one of broadcasting, unicasting or multicasting. This allows the amount of reporting and processing to be minimized because it is the specific mobile terminal 30 that may directly use the identified target carrier condition prediction function. Alternatively, the identified target carrier condition prediction function, f, remains at the first network node 10 where it will be subsequently used. Furthermore, the transmission step S115 in FIG. 8A may further include transmitting an event triggering criterion to the specific mobile terminal 30. Here, the event triggering criterion may be a universal, group-specific, or an individual event triggering criterion for the specific mobile terminal 30. The event triggering criterion may further depend on the estimated accuracy of the identified prediction function because each identified/trained prediction function may have its own, possibly unique, criterion. In other words, the criterion(s) may be related to the output of the identified prediction function, and different predictions function may have different outputs. In that sense the event triggering criteria may depend on the identified/trained prediction function. The triggering criterion may also be time-based to support periodic reporting, and additional aspects thereof will be illustrated below.

Figure 8A:
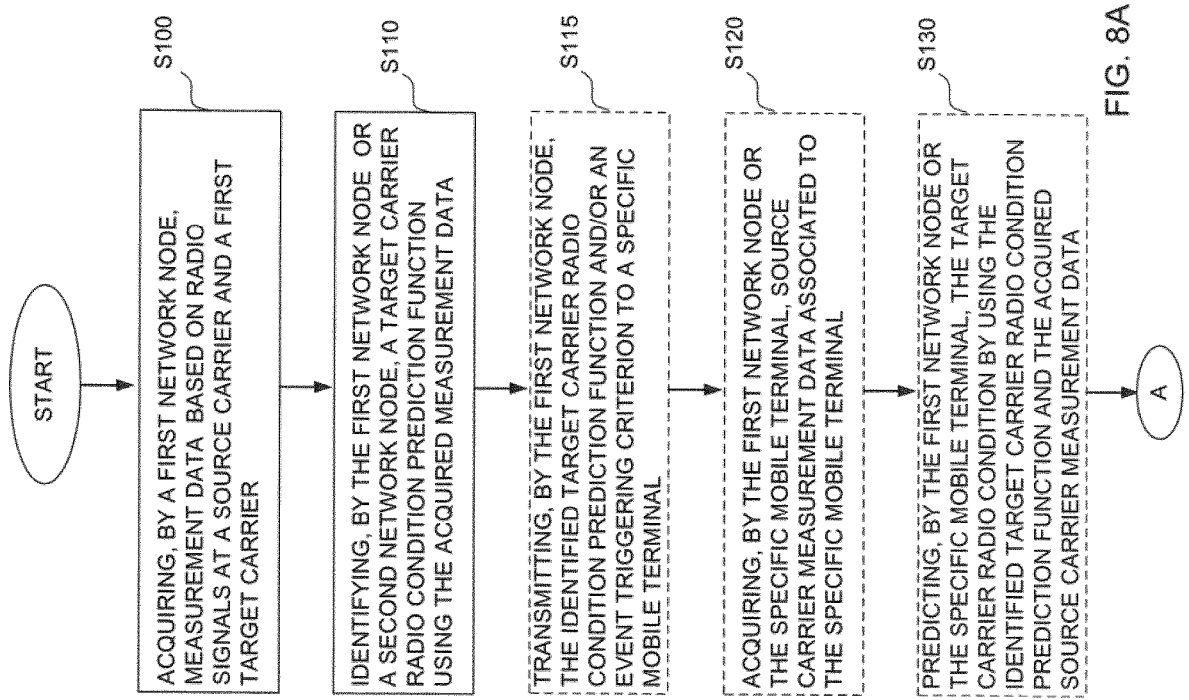
FIGS. 8A and 8B is a schematic flow diagram illustrating another embodiment of a method for predicting a target carrier radio condition in a communication network.

Further, according to step S120 in FIG. 8A the method may further include an acquiring step in which either the first network node 10 or the specific the specific mobile terminal 30, in case the prediction functions has been transmitted thereto, acquires source carrier measurement data that are associated with the specific mobile terminal 30. Here, the source carrier measurement data are again based on radio signals, as described above, and refer to the radio condition measurement data as described above in step S100. Specifically, the source carrier measurement data may comprise measurement data of one or more cells at the source carrier (frequency), may additionally comprise at least one further set of measurement data being associated to the source carrier. In other words, measurement data for at least two different radio signal conditions are acquired. In this execution phase, the now acquired measurement data are used in step S130 of FIG. 8A as input (x) to the identified target carrier radio condition prediction function f to predict the radio condition (y) at the first target carrier. This prediction step S130 may either be performed at the first network node 10 (by optionally retrieving the identified target carrier radio condition prediction function f from the second network node 20, as described above) or preferably at the specific mobile terminal 30.

Figure 8B:
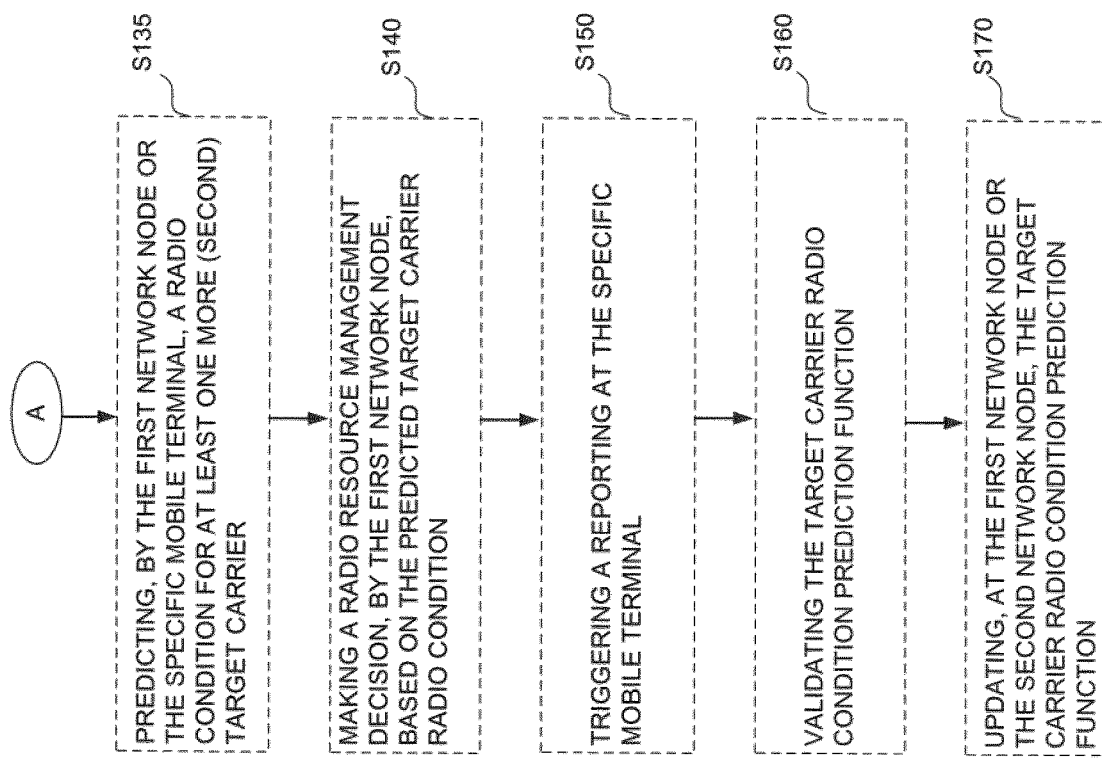

In a further embodiment of the method, as illustrated in step S135 according to FIG. 8B, the first network node 10 or the specific mobile terminal 30, may use the identified target carrier radio condition prediction function f to derive a prediction of a radio condition for at least one more (second) target carrier. This prediction may be performed in parallel to the above step S130. Here, the same predictor function f may not be used to predict radio conditions of different carriers if they're not co-located and have the same antenna pattern. With measurement data of a first carrier, however, it is possible to predict the target carrier condition on a second, third, fourth . . . carrier. This may require several mapping/prediction functions x→y1, x→y2, x→y3, . . . but still using the same input measurement data x (or possibly partly the same). In other words, with measurement data from a first, second (and possibly more) carriers, one can predict the target carrier condition on yet another carrier. That is, by combining the information from several carriers, a more confident prediction function may be identified compared to basing it on measurements data from a single carrier. That would, for example, require a mapping function x1, x2, . . . , xn→y, i.e. a prediction function f that depends on measurement data related to more than one carrier.

In a preferred embodiment of the method, as illustrated in step S140 according to FIG. 8B, the first network node 10 makes a radio resource management decision based on the predicted target carrier radio condition (y) as determined in step S130 described above. Here, depending on the specific value(s) of the predicted target carrier radio condition (y), in conjunction with load conditions in one or more cells, such a decision may be related to one of a handover decision, a load balancing decision, a carrier aggregation decision, and cell wake up, as will be further described below.

In a preferred embodiment of the method, as illustrated in step S150 according to FIG. 8B, a reporting, for example being related to the above prediction results, may be triggered at the specific mobile terminal 30. In particular, the reporting may be based on an event trigger criterion based on the outcome of the prediction function f, a periodic reporting using a periodic report period timer, an event trigger based on a predicted radio condition. Furthermore, the triggered report may be a flag only, for example on demand or periodically, or the triggered reporting includes only the predicted radio condition value(s).

In a preferred embodiment of the method, as illustrated in step S160 according to FIG. 8B, the identified prediction function f may further be validated, for example at the specific mobile terminal 30. For example, the specific mobile terminal 30 may voluntary (e.g., during idle times, load less than predetermined amount) acquire measurement data related to the target carrier and validates the correctness of the identified prediction function by comparing the acquired measurement data with predicted measurement data. The result of the validation may be reported to the serving network node 10 (e.g. periodically or during the triggered reporting), in particular when the predicted measurement data (y) is more than a threshold off from the measurement data. Alternatively, this validating step S160 may be performed at the first or second network node upon a corresponding request to the specific mobile terminal 30 to acquire and report measurement data.

In connection with the step S160 of FIG. 8B described above, or separately, the first network node 10 or the second network node 20 may perform in step S170 an updating of the prediction function f, for example based on a request from the UE 30. This updating may involve identifying/selecting a different prediction function from the pool of available prediction functions and/or adapting parameters of the previously identified prediction function in order to improve the measurement data matching. Such an updating step may be performed regularly based on a corresponding trigger reporting or when a previously identified prediction function has been invalidated in case of step S160.

The above illustrated embodiments of the method for predicting a target carrier radio condition may be performed by a suitably adapted network node 10 and network 20 as well as a suitably adapted mobile terminal 30 which overall form a corresponding system. In an embodiment the network nodes 10 and 20 and the mobile terminal 30 respectively comprise a processor and a memory wherein the memory contains instructions executable by the processor such that the network nodes 10 and 20 are operative to perform the method for predicting a target carrier radio condition.

Figure 9A:
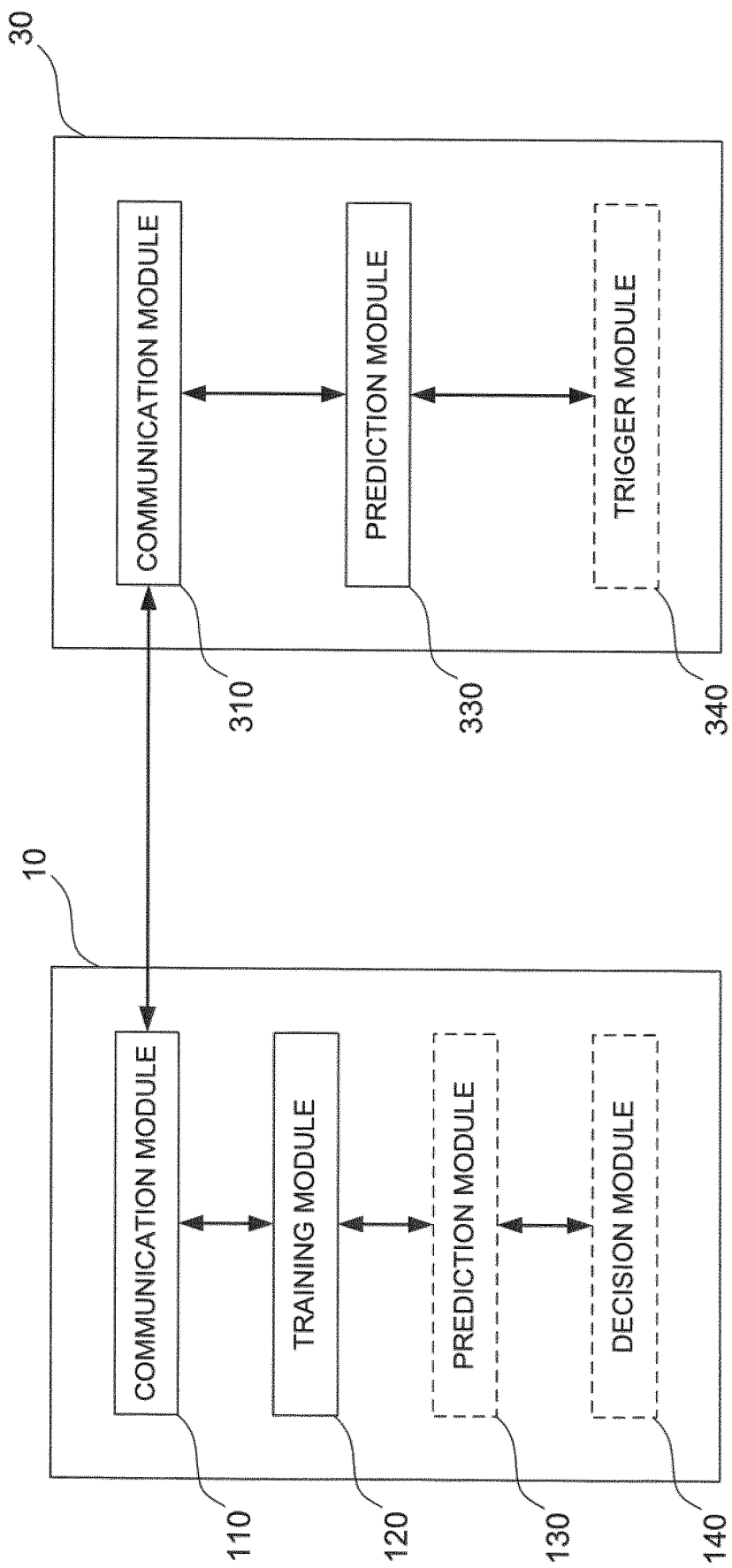
FIG. 9A further illustrates a network node 10 and a mobile terminal 30 according to an embodiment.

In a further embodiment, as illustrated in FIG. 9A the above method for predicting a target carrier radio condition is implemented in a network node 10. Here, the network node 10 includes a communication module 110 and a training module 120 as functional elements of one or more processors of the network node 10. Here, the communication module 110 is operative to perform the above described step S110, and the training module 120 is operative to perform the above described step S120. Further, the mobile terminal 30 includes a communication module 310 and a prediction module 330 as functional elements of one or more processors of the mobile terminal 30. Here, the communication module 310 is operative to acquire source carrier measurement data according to step S120 described above, and the prediction module 330 is operative to predict the target carrier radio condition according to step S130 as described above. Alternatively, the prediction of the target carrier radio condition according to step S130 may be performed in the network node 10 by the prediction module 130. In addition, the decision module 140 of the network node 10 is operative to make a RRM decision according to step S140 described above. Further, the trigger module 340 of the mobile terminal 30 is operative to perform the triggering step S150 as described above, such that the report that is transmitted between the communication modules of the network node 10 and the mobile terminal 30 may be used for the decision making. The apparatus configuration according to FIG. 9A may be used to implement a method that is further detailed in the context of FIG. 11A below.

Figure 9B:
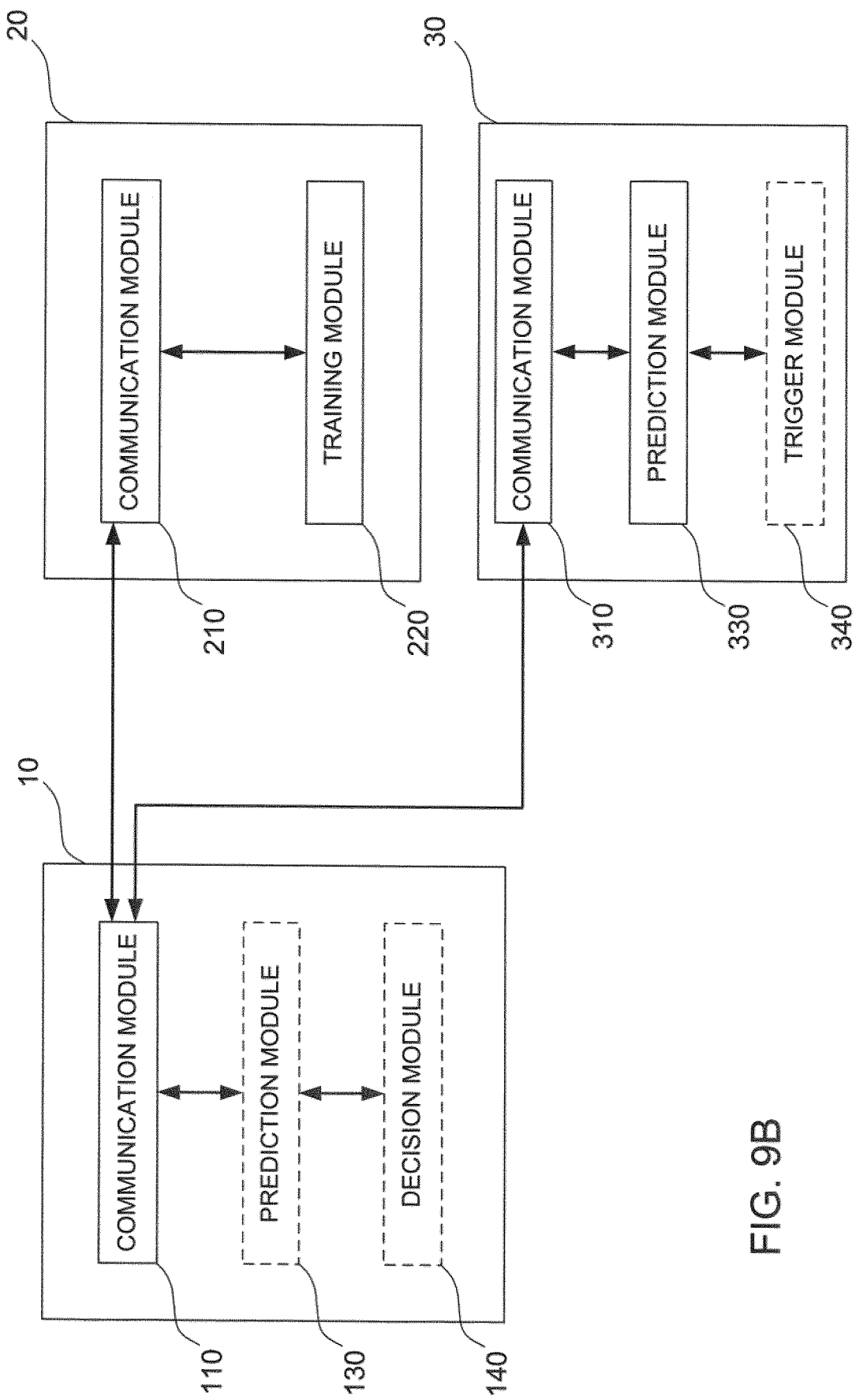
FIG. 9b further illustrates a network node 10, a network node 20, and a mobile terminal 30 according to an embodiment.

In a further embodiment, as illustrated in FIG. 9B the above method is implemented by using a second network node 20 which has a communication module 210 to acquire the measurement data and which is furthermore configured with a prediction module 220 to identify the prediction function according to step S110 described above. The apparatus configuration according to FIG. 9B may be used to implement a method that is further detailed in the context of FIG. 11B below.

Figure 10B:
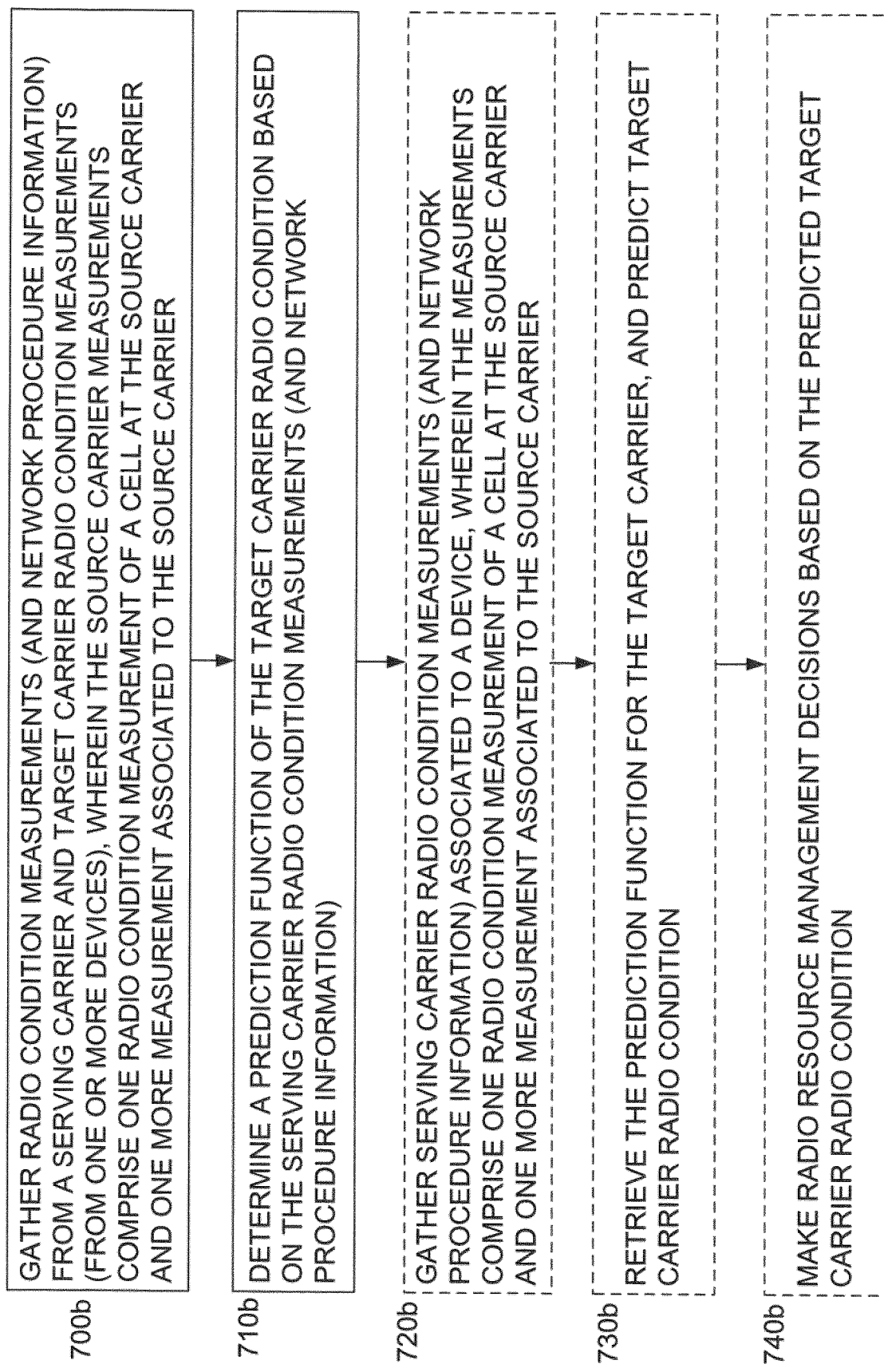

FIGS. 10A-C illustrate further embodiments related to the combination of the training phase (according to steps 700-710) and the execution phase (according to steps 720-740) from a terminal perspective.

According to step 700 of FIG. 10A, a (first) radio network node gathers/acquires measurement data based on DL and/or UP radio signals from one or more cells at source and target carriers, and optionally measurement reports. The considered measurements may comprise a radio condition measurement of one or more cells at the source (serving) carrier, and at least one measurement associated to the source carrier together (i.e. at the same time, within a predetermined time period) with a radio condition measurement of one or more cells at the target carrier. Optionally, in step 700 the (first or second) radio network node may also acquire network procedure information as explained above. Here, the measurement data may be acquired from one or more mobile terminals (UEs). In particular, the measurement data may be acquired by requesting the UEs to report the source carrier radio condition (used in input vector x) and to do inter-frequency measurement on the target carrier and to report the experienced radio conditions (output vector y) as described above. This training phase may, for example, be conducted in situations when the network is not over-loaded and where requesting to conduct measurements together with their reports does not have a significant impact on the network performance.

According to step 710 of FIG. 10A, these measurement data (and optionally the network procedure information) is used to identify the target carrier radio condition prediction function f, i.e. a prediction model. Here, the steps 700-710 may be performed in a second radio network node different from the above first radio network node, e.g. in another eNB or in a network core node (e.g. within a MME/S-GW). When sufficiently many measurement data have been collected, the network node identifies the prediction function f (step 710). The determination as to whether a sufficient number of measurements (and measurement data) have been gathered/acquired may, for example, be made on the basis of the number of UEs that have performed inter-carrier measurements, or when the identified prediction function f is accurate enough, for example by calculating the sum squared prediction error ($\Sigma\|f(x)\rightarrow y\|^2$). Moreover, the identification of a particular prediction function out of a pool of available prediction functions (f1, . . . , fn) may be based on a statistical analysis, for example, a comparison of respective sum squared prediction errors ($\Sigma\|f1(x)-y\|^2$) . . . , ($\Sigma\|fn(x)-y\|^2$). This may also include a training of prediction function parameters (for example, weights) of the respective available prediction functions (f1, . . . , fn) in order to derive and identify a prediction function for which the statistical analysis achieves an optimal result.

In the execution phase in step 720 according to FIG. 10A, the (first) radio network node (eNB) gathers/acquires source carrier measurement data associated to a specific UE or a plurality of specific UEs. Here, the source carrier measurement data may comprise a radio condition measurement data of a cell at the source carrier, and at least one further (and different) set of measurement data associated to the source carrier.

In step 730 according to FIG. 10A, the (first) radio network node (eNB) retrieves the identified prediction function (f) for the second carrier, as obtained either from the training phase in the first radio network node, or as obtained from the second radio network node different from first the radio network node. Based on the gathered source carrier measurements obtained in step 720 and the retrieved prediction function (f), the (first) radio network node subsequently predicts the target carrier radio condition.

In this execution phase, the identified prediction function $f(x) \rightarrow y$ is retrieved, and the network would like to have information on y without needing to directly measure it. This is the case because many RRM features require such knowledge to assign different UEs to different carriers and RATs. For instance, this is useful in IFLB to find out which UEs would have a sufficiently good outcome on y in order to be off-loaded in case of congestion in the source cell. Additional examples will be given below. The identified prediction function provides the network with the capability to get an improved estimate of y based on measurements on x and a specifically identified prediction function. As such, the network will therefore either use measurements that are readily available (used for other purposes other than for this prediction) or order new measurements to be reported from mobile devices that belong to a certain cell, and use these measurements to achieve an improved prediction of the target carrier radio condition values which are either not measurable or very expensive to measure, and for which the conventional methods only use a static and fixed relation. Examples of source carrier measurements that are readily available are PMI and TA, among others that have been described above. Examples of measurements that can be ordered to be reported by the UEs are RSRP values of the cells on the same carrier as and in the vicinity of the source cell.

In another embodiment, the (trained) prediction function that is identified uses first only the PMI and TA data values in order to preselect a group of UEs for which source cell RSRP data values are subsequently ordered to be reported, which will then altogether be used to identify a further prediction function to predict the target cell RSRP. Here, the further prediction function may be based on PMI, TA, and RSRP data values. Needless to say, these specific measurement data are just examples of data values that may be gathered/acquired and used for this purpose.

In another embodiment, the prediction function f may be updated based on the outcome from the execution phase. That is, when x and corresponding $y_{true}$ data values are acquired/gathered in the execution phase, where $y_{true}$ refers to actual measurement data, then the identification (training) of the prediction function f may be updated to also include this new measurement sample. It is further noted that the outcome of f(x) will determine if $y_{true}$ is available in the execution phase for each UE.

In step 740 according to FIG. 10A, the (first) radio network node makes an RRM decision in consideration of the predicted target carrier radio condition. As explained above, this RRM decision may be made, for example, with regard to a handover decision, a load balancing decision, and/or an aggregation decision involving one of CA, DC, or LAA.

Here, these RRM features/decisions frequently require inter-frequency information to assign different UEs to different carriers and RATs. The following three examples (A)-(C) provide further details in that regard.

(A) Load balancing: As aforementioned, when a source carrier cell is highly loaded, it is desirable to quickly perform off loading to less loaded target carrier cells. Here, the eNB may, by using the proposed method, find the appropriate UEs and send them to the target carrier, and with higher probability offload more traffic than when randomly picking UEs. With random picking of what UEs to perform inter-frequency measurements, the cell will stay highly-loaded for a longer time in comparison with picking the appropriate UEs. This is because a cell can only pick a limited number of UEs to perform inter-frequency measurements in each cycle due to limitations in signaling and/or processing.

(B) Carrier aggregation: UEs with carrier aggregation support will be able to perform radio measurement on a source and a target carrier simultaneously. That is, there is no need for a measurement gap since it will have two receiver chains (assuming that the second receiver chain is not used already). However, with an increasing amount of carriers deployed, a method for predicting the best target carrier is still useful since it reduces the need of measuring on all candidate carriers. Using the proposed method, the identified prediction function may therefore output the best carrier and the corresponding cell for each UE. The training phase would thus comprise UE reports of radio conditions on the candidate carrier frequencies.

(C) Cell wake up: here, the cell on another (target) carrier is set into idle mode in order to save energy. Target carrier radio prediction may be used to turn on the idle cells if a number of users predict coverage of the idle target carrier cell.

Figure 11A:
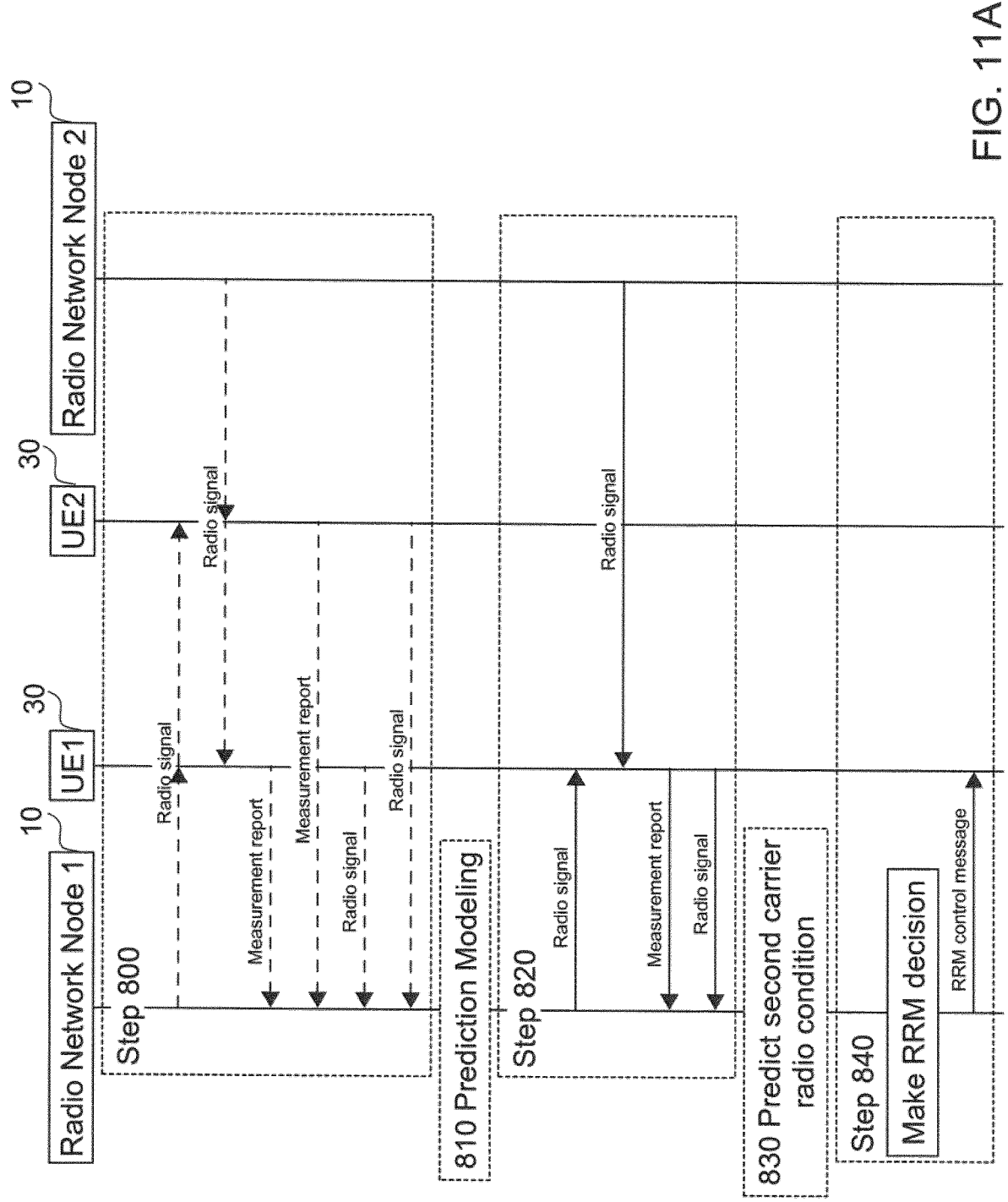
FIG. 11A and FIG. 11B are schematic flow diagrams illustrating another embodiments of a method for predicting a target carrier radio condition in a communication network.

The above embodiment is also illustrated by the signaling chart in FIG. 11A. Here, the (i) training phase is described by steps 800 and 810, where step 800 involves the gathering/acquiring of measurement data. These measurements data may be gathered/acquired by one or more UEs (here, UE1 and UE2) based on radio signals at the source and/or target carries from one or more radio network nodes and are reported to a first radio network node. Measurement data may also be gathered/acquired in the radio network node based on UL transmissions by one or more UEs of radio signals. Here, the measurement data as acquired by the one or more UEs are transmitted to a radio network node using appropriate measurement reports. At step 810 according to FIG. 11A (which is referred to as prediction modeling here), the target carrier radio condition prediction function (f) is identified in correspondence to step 710 in FIG. 10A. In FIG. 11A, the steps 800 and 810 are shown to be performed by the first radio network node 10. Optionally, the steps 800 and 810 may also be performed by the illustrated second radio network node.

With the identified prediction function (f) in place, the first radio network node proceeds in step 820 of FIG. 11A to acquire/gathers measurement data associated to a specific UE, for example based on measurement reports transmitted from the UE, and subsequently predicts a target carrier radio condition in consideration of the acquired measurement data and the prediction function (f) in step 830. Based on the predicted target carrier radio condition, the first radio network node makes an RRM decision based on the predicted second carrier radio condition in step 840 in correspondence with step 740 according to FIG. 10A as described above.

Figure 11B:
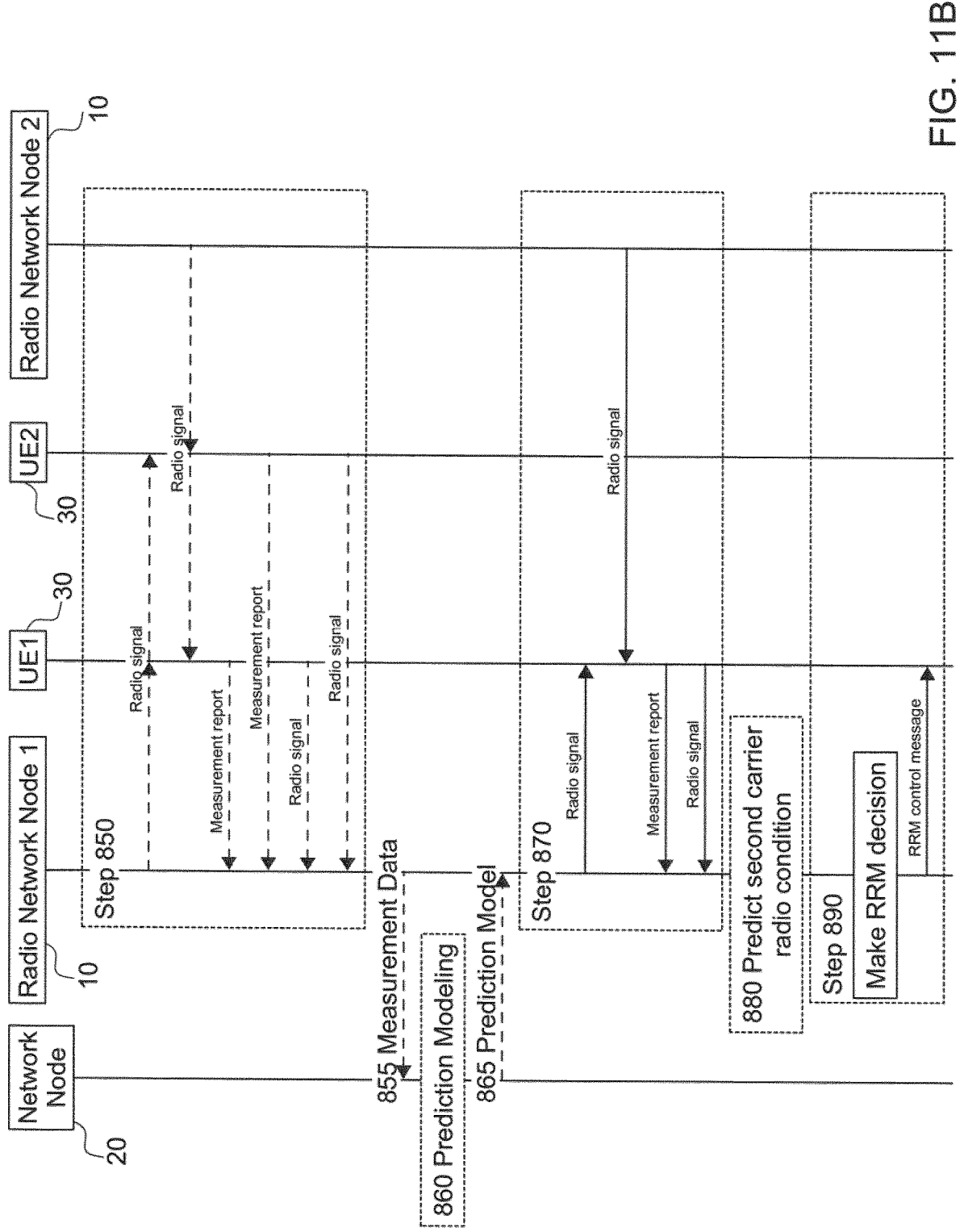

Optionally, the prediction function estimation may also be performed in a second network node 20 (e.g., a core network node, such as MME/S-GW) different from the first and second radio network node as illustrated by FIG. 11B. Here, step 850 is the same as step 800, step 870 is the same as step 820, step 880 is the same as step 830, and step 890 is the same as step 840. The difference to FIG. 8A (described above) is that the acquired measurement data are sent to the separate network node (step 855), which in turn estimates/ identifies the prediction function (f) (step 860) and sends the identified prediction function (f) to the first radio network node (in step 865).

Here, for each set of source carrier radio condition measurement data (x), corresponding target carrier radio condition measurement data (y) are collected, based on which a specific prediction function (f(x)→y) is identified (trained). Two cases may be further distinguished here:

The prediction function (f) is based on one set of source carrier radio condition measurement data (x1), and at least one other set of measurement data (x2) associated to the source carrier, see FIG. 10B (in particular, steps 700b-720b)

The prediction function (f) is characterized by at least two parameters, see FIG. 10C (in particular, step 710b)

Figure 10D:
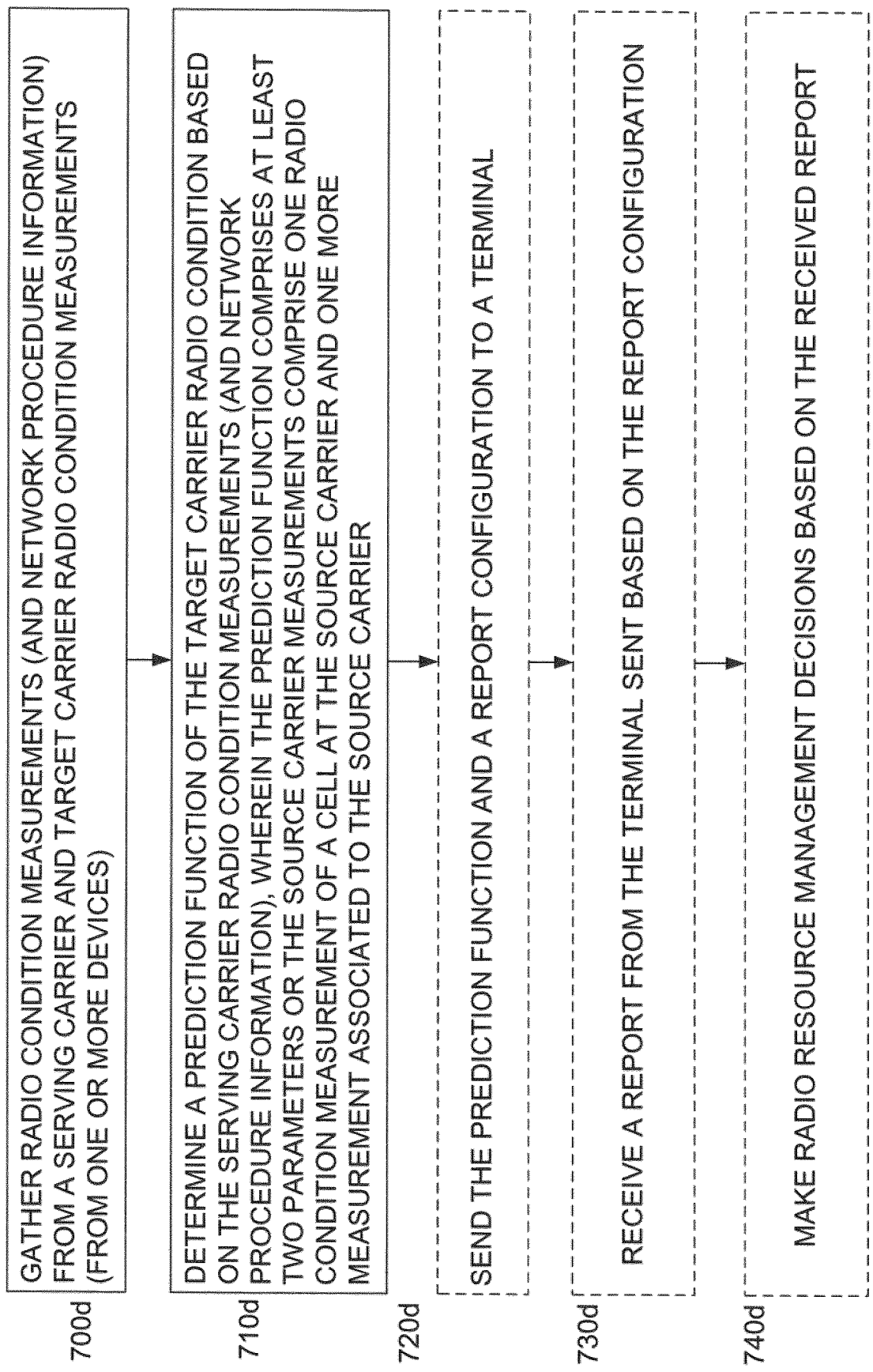

In the above embodiments, the mobile terminal (UE) may be said to be blind to the prediction function and the procedure that is proposed, because the UE only serves the network node with measurement data/reports when requested, as illustrated in FIGS. 10A-10C and FIGS. 11A-B. In another embodiment, the mobile terminal (UE) may be provided with the identified prediction function so that it does not have to report the measurement data to the network node. Instead, the UE may just transmit a predicted measurement value based on the received prediction function and the collected measurement data. This approach enables a more distributed execution of the procedure over the terminals, and is further illustrated in FIGS. 10D-10E. In particular, according to step 720d in FIG. 10D, the identified prediction function as well as a report configuration is transmitted to the mobile terminal. Upon making a prediction of the target carrier radio condition(s) using acquired source carrier measurement data at the mobile terminal, the mobile terminal transmits a report according to the report configuration to the network node in step 730d of FIG. 10D. The individual processing steps from the mobile terminal in this scenario, i.e. receiving the prediction function, acquiring radio condition measurements to acquire source carrier measurement data, predicting the target carrier radio condition, and sending a configured report, are illustrated in FIG. 10E. The RRM decision, as explained in detail above, is the made in step 740d of FIG. 10D at the network node.

Figure 10F:
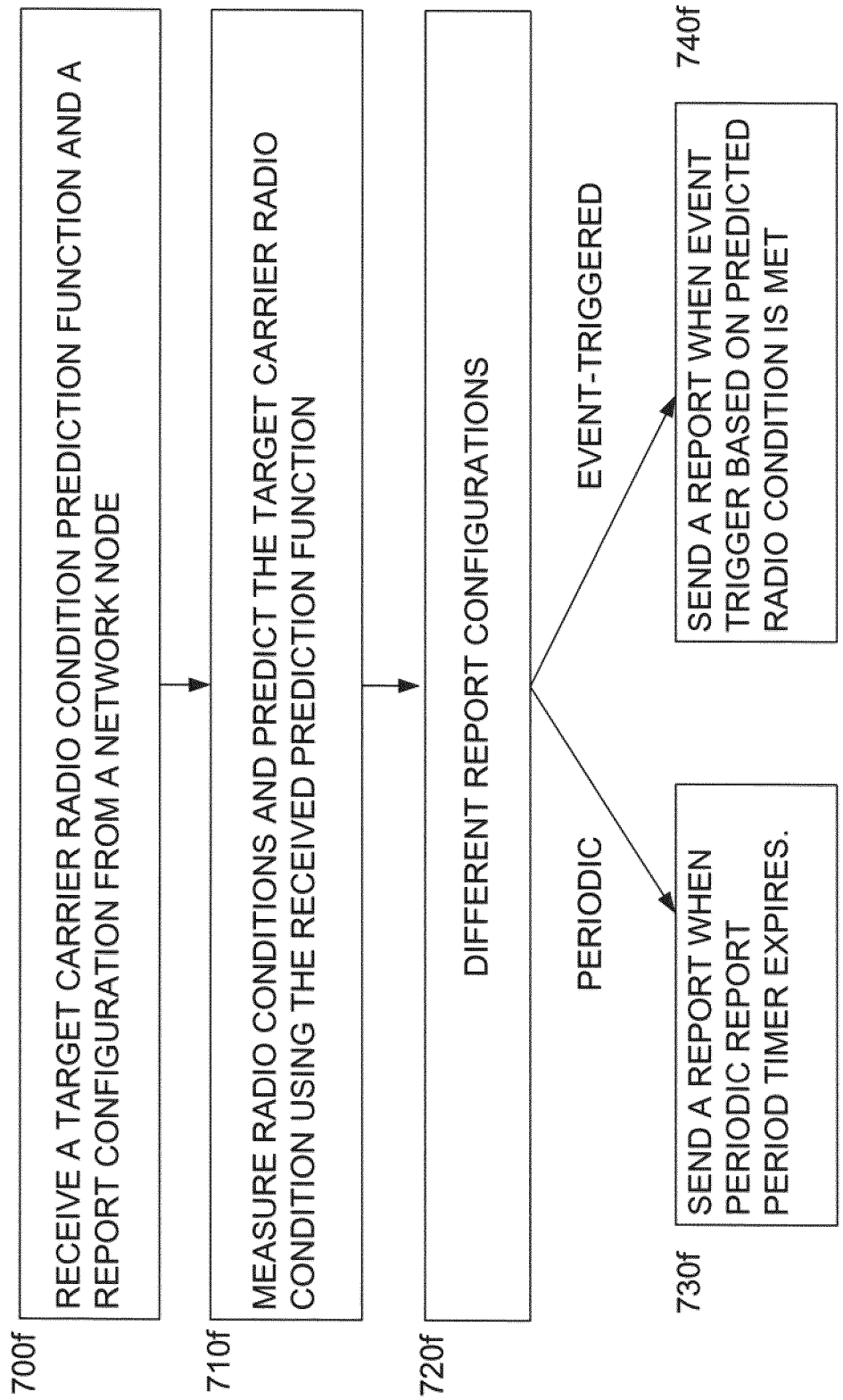

FIG. 10F further illustrates another embodiment, which further extends the previous embodiment and wherein the mobile terminal (UE) is provided with a trigger criterion, for example included in the report configuration, that may be based on the outcome/result of the prediction function, and with which a UE may perform a reporting when the trigger is met, as illustrated in FIG. 10F. A variety of different trigger criteria have been described above. In one example, the trigger report may consist of a flag that indicates that the trigger has been met. More specifically, according to step 720f in FIG. 10F and different report configurations, a first option is illustrated according to step 730f according to which the report is transmitted periodically, for example when a periodic report period timer expires. Alternatively or in addition thereto, an event trigger may be set up such that a report is transmitted when a particular radio conditions is met which, for example, is relevant for making a RRM decision, for updating the prediction function or the like.

Steps according to the embodiment thus comprises the network node (eNB) signaling the prediction function f to the UEs for radio condition prediction, and optionally signaling one or more event triggering criteria ($y \lessgtr \varepsilon$). The mapping function and the optional event triggering criteria may be the same for all UEs, may be the same for a subset of the UEs, or may be individual for each UE. The signaled information may be broadcasted or transmitted to a subset of UEs, for example, taking into account that some UEs may not support some carrier frequencies. Also, the event triggering criteria may be different for each UE based on their individual requirements. For example, some UEs may require a higher signal strength on the target carrier in order to satisfy their corresponding quality of service requirements. When an event triggering criterion is met, the UE sends a report to the network node. Upon receiving a report, the network node takes a radio resource management decision.

The identified prediction (mapping) function and the (event) triggering criteria signaling from the network node to the UEs may thus comprise the aspects of:

Feature information: What are the UE required measurements

Model type information: The mapping function type

Model specific information: Parameters for the chosen/selected/determined mapping function type Periodic reporting, aperiodic reporting, or trigger-based reporting (specifies the reporting triggering criteria)

Reporting format: Specifies the format of the UE report.

An example of the model-reporting embodiment using an ASN.1-format is shown in the following:

```
-- ASN1START
Inter-frequency-mapping-function::= SEQUENCE {
Feature-information SEQUENCE{features}
model-information ENUMERATED VECOTR
{linear-regr,maximum-likelihood,nearest-neighbor,....}
    model-specific-information SEQUENCE[model-specific}
    reporting-criteria FLOAT
    reporting-format ENUMURATED {is-met,f(x),...} OPTIONAL
features ::= {
    feature-type ENUMERATED {RSRP,angle_of_arrival,...}
    cell-id INTEGER (0..503)    OPTIONAL
    }
    Model-specifc ::={
    % Machine learning model parameters
    }
-- ASN1STOP
```

The combination of the identified prediction (mapping) function (radio condition prediction) and the optional event triggering criterion/criteria are further exemplified on the basis of the following example (A) Linear regression of radio condition measurements (as described above): The measurement data vector x (serving carrier information) may, for example, be used in a linear regression approach as follows:

$$f(x) = \sum_i w_i x_i,$$

where w is the weight for feature i. The model-specific information according to this embodiment is the weight ($w_i$) for each feature in x. The network node may optionally also signal the report triggering criteria ($\epsilon$), if the UE is configured to report when triggered, e.g., if $f(x) \leq \epsilon$. The triggered reporting format may be an integer indicating what inter-frequency mapping criterion is met; and it may also contain the scalar value f(x). Such a triggering, e.g., if $f(x) \leq \epsilon$, may similarly be applied for other types of prediction functions, such as the maximum likelihood prediction function using radio condition measurements, and the relative vector distance prediction function described above.

The above is related to the concept of radio fingerprinting which is a technique for improving the selection of what properties being related to radio signals should be measured at the UEs, for example with regard to the target carrier. Based on a certain radio fingerprint comprising, for example, RSRP measurement on the serving carrier, a target carrier radio condition can be predicted. The prediction from the serving carrier to the target carrier is handled by the identified prediction function, as explained above. The downside of a radio fingerprinting in which the prediction function calculations are performed at the eNB, and hence the UE needs to continuously report (measured) serving carrier information results in a large reporting overhead. This overhead is especially evident or problematic in cases when the cell is (already) in a high-load situation, which is the situation that the load balancing procedure is trying to mitigate. As mentioned, carrier aggregation could also be used for the same purpose. Ordering UEs to report their measurements in a high-load situation would, however, have a much bigger impact on the cell "well-being" with regard to, e.g., network capacity utilization than in a low-load situation. For the load-balancing (or carrier aggregation) to do its job even more efficiently, one would not like to burden the already burdened cell even more by initiating load balancing (or carrier aggregation). This disadvantage is overcome here due to the fact that the evaluation criteria and the prediction function are transmitted to the UE.

The embodiments and concepts described above provide the following additional advantages. Specifically, all functionality related to inter-frequency measurement stand to gain because less expensive measurements can be used instead. Less expensive refers to some or all of the following costs: air interface signaling, processing in the eNB, UE battery consumption, UE performance. Furthermore, radio conditions for multiple other (target) carriers may be predicted in parallel for an individual UE, which means that the cost reduction will be even more significant when there are more candidate carriers.

Moreover, instead of randomly selecting UEs and requesting each of them to perform inter-frequency measurements, suitable UEs may be targeted much more efficiently. This means that with regard to load balancing the following gains are enabled: (i) Reduced number of inter-frequency measurements per UE which provides all of the general benefits mentioned above; (ii) Load differences are neutralized faster which means that system resources are utilized more efficiently; (iii) Multiple target carriers may be evaluated for an individual UE without increasing the number of inter-frequency measurements, which allows the load balancing function to distribute UEs in a more efficient way.

In addition, aggregation functionalities such as CA, DC and LAA may allow a UE to use secondary cells on other carriers. The present embodiments and concepts allow those secondary cells to be setup up faster and with less effort. This is due to fact that the UE can faster find its best cell on the best target carrier with the proposed solution. Less effort in terms of that ensures that a UE will measure on a fewer number of target carrier cells, in e.g. CA, and the UE will find the best target carrier faster (less effort). If, on the other hand, no secondary cell coverage is available, the UE may also avoid the effort of trying to search for secondary cells. This provides all of the general gains mentioned above.

Moreover, the present embodiments and concepts also provide gains in mobility scenarios with bad coverage. For example, when a UE is moving out of coverage on the source carrier, making a fast RRM decision making is key. This present embodiments and concepts allows a faster decision making since parallel target carriers can be predicted in a more accurate way and therefore evaluated faster and better compared to using cumbersome parallel/sequential inter-frequency measurements. Decisions can also be made, based only on the prediction which allows inter-frequency measurements to be avoided completely in time critical situations or in situations where the prediction is considered quite accurate.

In addition, multiple serving carrier measurement reports from the UE may be avoided which traditionally an eNB would has ordered for the purpose of radio condition prediction of a cell at a different carrier on the network side, for example to do fingerprinting.

By instead performing the radio condition mapping at the UE and only report the predicted value, possibly also event-trigger the report based on the predicted value, reduces the UL overhead substantially compared to if the serving eNB decides to carry out the prediction for all the UEs in its serving area (for load balancing purpose as an example). In the existing methods, the serving eNB would have configured all the UEs to send the source measurement report "x" whereas in the proposed embodiments, the serving eNB just either broadcasts or unicasts or multicasts the mapping (prediction function) that is used to construct a combined result "y" to report, and optionally a criterion for triggering the measurement report indicating the successful detection of the neighboring cell in alternate carriers.

Another advantage is that the measurements that UE has are of much higher granularity/quality than those received by the eNB since the UE does not need to quantize them. The UE can calculate a decision directly on the raw measurement data that it has. If the measurement data are instead reported, they need to be quantized due to the limitation in the number of bits the report can allocate. Hence, the decision that the UE makes based on the same model would be more accurate than if it would have been made at the eNB. As such, the burden of carrying out all the mapping function processing may be distributed amongst the UEs in the coverage area of the eNB rather than the eNB collecting all measurements on serving carrier and carrying out the mapping function operation. However, note that the load balancing decision is still network controlled and only mapping function processing is off loaded to the UEs.

The above respective modules may be implemented by a processing unit that include one or a plurality of processors, a microprocessor or other processing logic that interprets and executes instructions stored in a main memory. The main memory may include a RAM or other type of dynamic storage device that may store information and instructions for execution by the respective modules/units. For example, the communication modules 110 and 310, the training module 120, the prediction modules 130 and 330, the decision module 140, and the trigger module 340 discussed above with respect to FIG. 9A may be realized by the processing unit/processor. The ROM may include a ROM device or another type of static storage device that may store static information and instructions for use by the processing unit.

As mentioned above, the network nodes 10 and 20 as well as the mobile terminal 30 may perform certain operations or processes (acquiring, identifying, transmitting, predicting, decision making, etc.) described herein. The network nodes 10 and 20 may perform these operations in response to the processing unit/processor executing software instructions contained in a computer-readable medium, such as the main memory, ROM and/or storage device. A computer-readable medium may be defined as a physical or a logical memory device. For example, a logical memory device may include memories within a single physical memory device or distributed across multiple physical memory devices. Each of the main memory, ROM and storage device may include computer-readable media with instructions as program code. The software instructions may be read into the main memory for another computer-readable medium, such as a storage device or from another device via the communication interface.

Further, the software instructions contained in the main memory may cause the processing unit(s) including a data processor, when executed on the processing unit, to cause the data processor to perform operations or processes described herein. Alternatively, hard-wired circuitry may be used in place or on in combination with the software instructions to implement processes and/or operations described herein. Thus, implementations described herein are not limited to any specific combination of hardware and software.

The physical entities according to the different embodiments of the invention, including the elements, units, modules, nodes and systems may comprise or store computer programs including software instructions such that, when the computer programs are executed on the physical entities, steps and operations according to the embodiments of the invention are carried out, i.e. cause data processing means to carry out the operations. In particular, embodiments of the invention also relate to computer programs for carrying out the operations/steps according to the embodiments of the invention, and to any computer-readable medium storing the computer programs for carrying out the above-mentioned methods.

Where the term module is used, no restrictions are made regarding how distributed these elements may be and regarding how gathered these elements may be. That is, the constituent elements/modules/units of the network nodes 10 and 20 as well as the mobile terminal 30 may be distributed in different software and hardware components or other devices for bringing about the intended function. A plurality of distinct elements/modules may also be gathered for providing the intended functionality. For example, the elements/modules/functions of the UE/nodes may be realized by a microprocessor and a memory similar to the above node including a bus, a processing unit, a main memory, ROM, etc. The microprocessor may be programmed such that the above-mentioned operation, which may be stored as instructions in the memory, are carried out.

Further, the elements/modules/units of the apparatus may be implemented in hardware, software, Field Programmable Gate Arrays (FPGAs), application-specific integrated circuits (ASICs), firmware or the like.

It will be apparent to those skilled in the art that various modifications and variations can be made in the entities and methods of this invention as well as in the construction of this invention without departing from the scope or spirit of the invention.

The invention has been described in relation to particular embodiments and examples which are intended in all aspects to be illustrative rather than restrictive. Those skilled in the art will appreciate that many different combinations of hardware, software and/or firmware will be suitable for practicing the present invention.

Moreover, other implementations of the invention will be apparent to those skilled in the art from consideration of the specification and practice of the invention disclosed herein. It is intended that the specification and the examples be considered as exemplary only, wherein abbreviations used in the above examples are listed below. To this end, it is to be understood that inventive aspects lie in less than all features of a single foregoing disclosed implementation or configuration. Thus, the true scope and spirit of the invention is indicated by the following claims.

The invention has been described in relation to particular embodiments and examples which are intended in all aspects to be illustrative rather than restrictive. Those skilled in the art will appreciate that many different combinations of hardware, software and/or firmware will be suitable for practicing the present invention.

FURTHER EXAMPLES

Example 1

Figure 12:
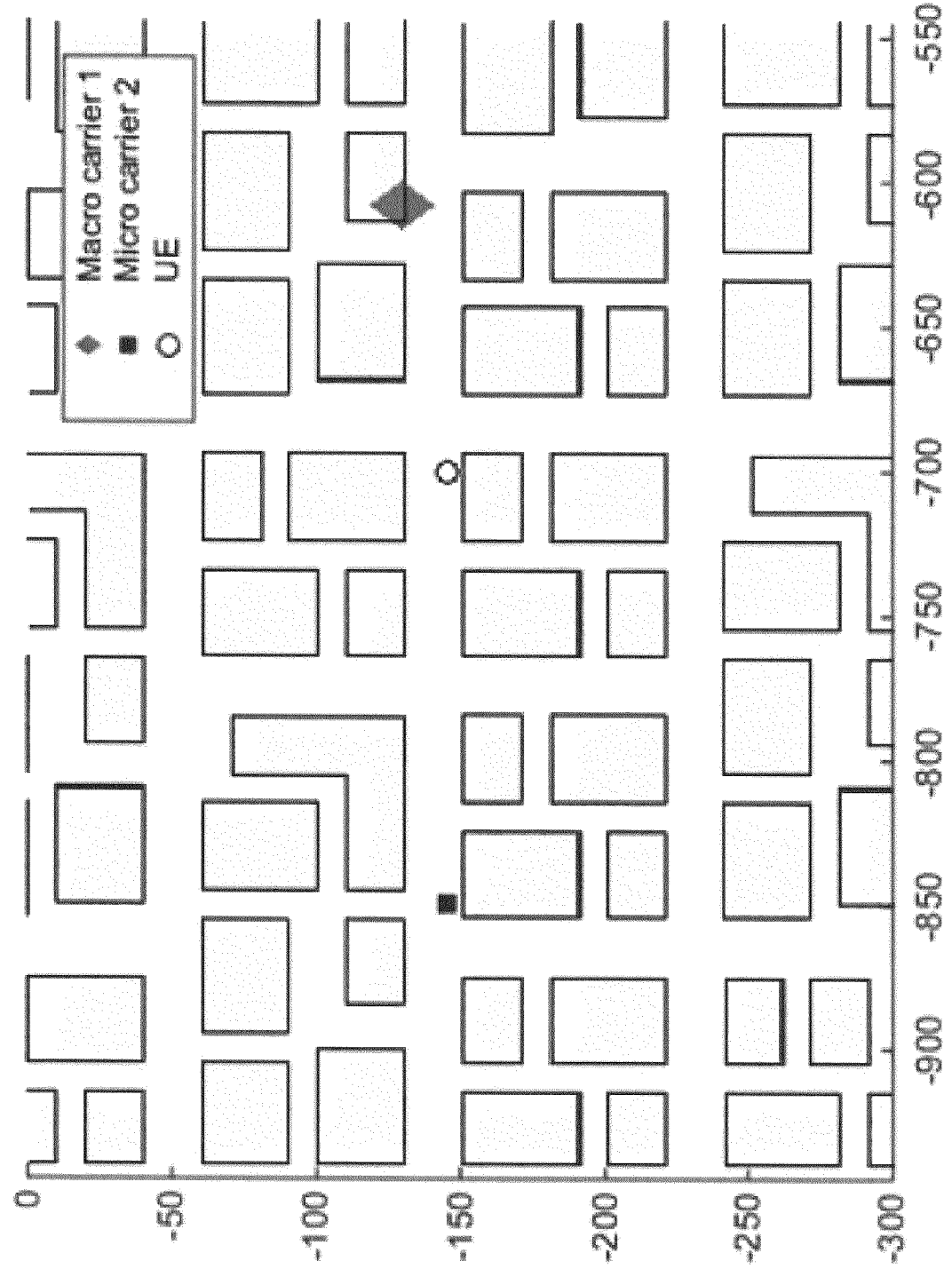
FIG. 12 illustrates a further embodiment in which a macro eNB operates on a serving carrier and one micro cell operates on the target carrier.
Figure 13:
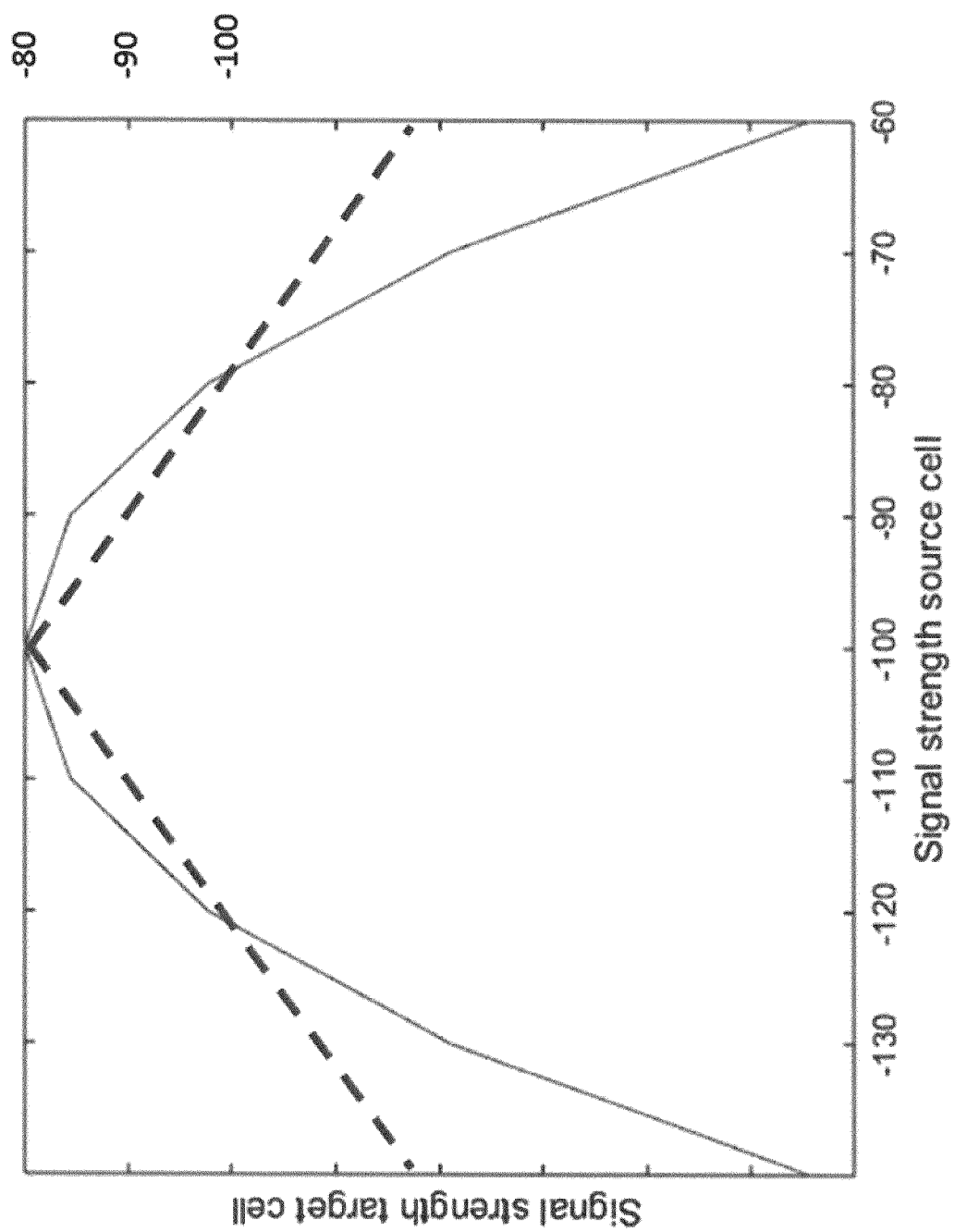
FIG. 13 illustrates a comparison of real measurement data compared with a radio condition prediction function.
Figure 14:
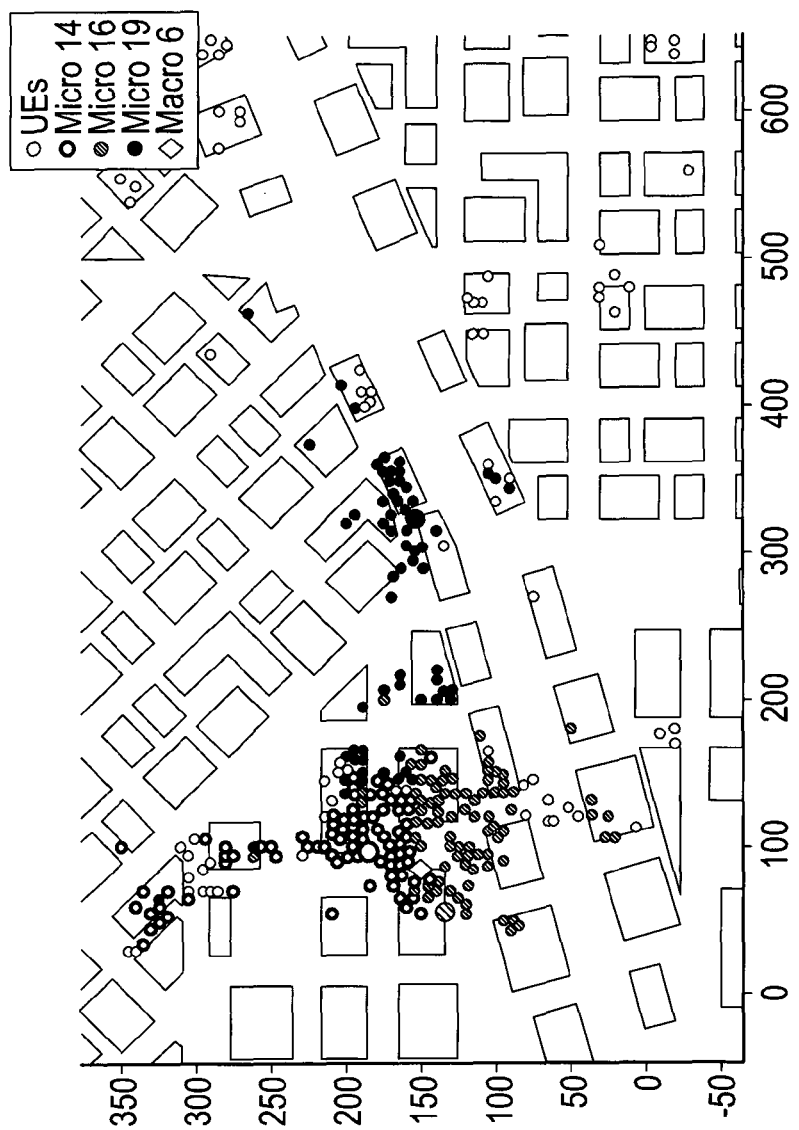
FIG. 14 illustrates a further embodiment comprising multiple cells wherein the UE may be potentially served by different microcells.

Here, a deployment is considered as shown in FIG. 12 where a macro eNB operates on the serving carrier 1, and one micro cell on the target carrier 2. A UE is moving towards the micro cell that is operated on carrier 2. The UE is expected to have coverage when the signal strength of the serving carrier cell meets a certain criteria. This is illustrated in FIG. 13, when the serving cell signal strength is within [−120,−80] dBm, the target micro cell will provide sufficient signal strength. The prediction function is determined in the training phase, in this example, only the serving cell signal strength is used as an input to the identified prediction function, and the input vector x is thus a scalar value. Based on FIG. 12, where the signal strength is sufficient when the serving cell signal strength is in range of [−120, −80], and an appropriate radio condition prediction function may be based on a relative measurement model structure:

$$f(x)=w_0+w_1|x-\theta|$$

Given FIG. 12, the identified radio condition prediction may be $f(x)=-80-|x+100|$, which is illustrated as the dashed curve. Optionally, one can also define a report triggering condition based on the predicted radio condition, for example that $f(x)>-100$.

Example 2

In this example, a scenario with multiple target carrier cells is considered. Information of the strongest cell on the target carrier is useful when taking for example load balancing decisions. Typically, only a set of the target carrier cells is available for load balancing, it is therefore important to predict the strongest target carrier cell for each UE.

FIG. 13 illustrates multiple cells and UEs potentially supported by different micro cells. For successful load balancing, also the cell load needs to be considered. One way to consider this is to adapt the report triggering condition, so that highly loaded cells are more strictly reported. Reconsidering example 1, where the radio condition prediction of a specific second carrier cell was formulated as $$f(x)=-80-|x+100|$$

with a nominal report triggering criterion $f(x)>-100$. When this potential target cell becomes more loaded, the triggering criterion can be adapted and reconfigured to make the UE to be less prone to report the highly loaded cell, e.g. a report criterion $$f(x)>h(\text{cell load})$$

where h is adapted based on the cell load. In one instructive example, h(low load) is −100, while h(high load) is −90, but a more refined adaption is also possible.

Example 3

Again the same deployment as shown in FIG. 12 is considered. It is further assumed here that that macro cell collects PMI reports alongside the RSRP reports from the user. Since the PMI values provide angular information of the UE relative to the network node, we can extend our prediction function in the above Example 1 to incorporate that as a complementary measurement ($x_1$ is RSRP in dB and $x_2$ is PMI in degrees):

$$f(x_1,x_2)=w_0+w_1|x_1-\theta_1|+w_2|x_2-\theta_2|$$

Here, an angle is set to 0 degrees to the right of the horizontal axis with the macro node as the origin in FIG. 12. Then a prediction function that will give an appropriate penalty if a measurement is outside the angular range of interest can be written as $$f(x_1,x_2)=-80-|x_1+100|-2|x_2-190|$$

Abbreviations

DL Downlink
UL Uplink
eNB Enhanced NodeB
LB Load Balancing
UE User Equipment
RSRP Reference Signal Received Power
CA Carrier Aggregation #
CC Component Carrier
DC Dual Connectivity
DRB Data Radio Bearer
EPS Enhanced Packet System
IFLB Inter-Frequency Load Balancing
LAA Licensed Assisted Access
MAC Medium Access Control
MCG MeNB Cell Group
MeNB Master eNB
MME Mobility Management Entity
RRC Radio Resource Control
PCell Primary Cell
PMI Precoder Matrix Indicator
PRB Physical Resource Block
PSCell Primary SCG Cell
RRM Radio Resource Management
RSRP Reference Signal Received Power
SCell Secondary Cell
SCG SeNB Cell Group
SeNB Secondary eNB
S-GW Serving GateWay
TA Timing Advance

The invention claimed is:

1. A method for predicting a target carrier radio condition in a communication network, comprising the steps of:
   acquiring, by a first network node, measurement data based on radio signals at a source carrier and a first target carrier, wherein the first target carrier is present in a non co-located cell; and
   identifying, by the first network node or a second network node, a target carrier radio condition prediction function using the acquired measurement data, wherein the identified target carrier radio condition prediction is transmitted to a specific mobile terminal, and wherein the first network node forwards the acquired measurement data to the second network node when the target carrier radio condition prediction function is identified by the second network node;

acquiring, by the first network node or the specific mobile terminal, source carrier measurement data associated to the specific mobile terminal;

predicting, by the first network node or the specific mobile terminal, a first target carrier radio condition by using the identified target carrier radio condition prediction function and the acquired source carrier measurement data; and predicting, by the first network node or the specific mobile terminal, a radio condition for at least one more second target carrier in parallel to predicting the first target carrier radio condition, wherein a training phase for identifying the target carrier radio condition prediction function is conducted when the communication network has a load that is smaller than a predetermined load factor.

2. The method for predicting a target carrier radio condition according to claim 1, further comprising:

transmitting, by the first network node, an event triggering criterion to the specific mobile terminal.

3. The method for predicting a target carrier radio condition according to claim 1, further comprising: making a radio resource management decision, by the first network node, based on the predicted target carrier radio condition.

4. The method for predicting a target carrier radio condition according to claim 2, further comprising: triggering a reporting at the specific mobile terminal.

5. The method for predicting a target carrier radio condition according to claim 1, wherein the target carrier radio condition prediction function is based on measurement data of at least two different radio signal conditions.

6. The method for predicting a target carrier radio condition according to claim 1, wherein the target carrier radio condition prediction function has at least two parameters.

7. The method for predicting a target carrier radio condition according to claim 1, wherein the identifying step comprises a selecting step of selecting the prediction function from a pool of prediction function types.

8. The method for predicting a target carrier radio condition according to claim 7, wherein the selecting is based on a statistical analysis.

9. The method for predicting a target carrier radio condition according to claim 1, wherein a training phase for identifying the target carrier radio condition prediction function is conducted when a number of source carrier measurements and a number of target carrier measurements is larger than a predetermined number.

10. The method for predicting a target carrier radio condition according to claim 1, further comprising: validating the target carrier radio condition prediction function.

11. The method for predicting a target carrier radio condition according to claim 1, further comprising: updating, or the second network node, the target carrier radio condition prediction function.

12. The method for predicting a target carrier radio condition according to claim 1, wherein the target carrier radio condition prediction function further depends on a status of the environment and/or time.

13. A network node, comprising:

a communication module configured for acquiring measurement data based on radio signals at a source carrier and a target carrier, wherein the first target carrier is present in a non co-located cell; and a training module configured for:

identifying a target carrier radio condition prediction function using the acquired measurement data, wherein the identified target carrier radio condition prediction is transmitted to a specific mobile terminal;

acquiring source carrier measurement data associated to the specific mobile terminal;

a prediction module configured for:

predicting a first target carrier radio condition by using the identified target carrier radio condition prediction function and the acquired source carrier measurement data; and predicting a radio condition for at least one more second target carrier in parallel to predicting the first target carrier radio condition, wherein the training module conducts a training phase for identifying the target carrier radio condition prediction function when the communication network has a load that is smaller than a predetermined load factor.

14. A mobile terminal, comprising:

a communication module configured for receiving an identified target carrier radio condition prediction function and/or an event triggering criterion from a network node; and acquiring source carrier measurement data associated to the mobile terminal;

a prediction module configured for:

predicting a first target carrier radio condition by using the identified target carrier radio condition prediction function and the acquired source carrier measurement data; and predicting a radio condition for at least one more second target carrier in parallel to predicting the first target carrier radio condition, wherein the target carrier radio condition prediction function is identified based on a training phase conducted when the communication network has a load that is smaller as a predetermined load factor.

15. The mobile terminal according to claim 14, further comprising: a trigger module configured for triggering a reporting of the predicted target carrier radio condition.

16. The mobile terminal according to claim 14, wherein the prediction module is further configured for validating the target carrier radio condition prediction function.

17. A method of operating a mobile terminal comprising:

receiving an identified target carrier radio condition prediction function and/or an event triggering criterion from a network node;

acquiring source carrier measurement data associated to the mobile terminal; and predicting a first target carrier radio condition by using the identified target carrier radio condition prediction function and the acquired source carrier measurement data;

predicting a radio condition for at least one more second target carrier in parallel to predicting the first target carrier radio condition, wherein the target carrier radio condition prediction function is identified based on a training phase conducted when the communication network has a load that is smaller as a predetermined load factor.

* * * * *